(12) United States Patent
Pinnau et al.

(10) Patent No.: US 6,896,717 B2
(45) Date of Patent: May 24, 2005

(54) GAS SEPARATION USING COATED MEMBRANES

(75) Inventors: Ingo Pinnau, Palo Alto, CA (US); Zhenjie He, Fremont, CA (US); Rolande J. Blanc, San Jose, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 104 days.

(21) Appl. No.: 10/612,807

(22) Filed: Jul. 2, 2003

(65) Prior Publication Data

US 2004/0050250 A1 Mar. 18, 2004

Related U.S. Application Data

(60) Provisional application No. 60/394,112, filed on Jul. 5, 2002.

(51) Int. Cl.⁷ .................. B01D 53/22; B01D 63/02; B01D 71/06
(52) U.S. Cl. .................. 95/51; 95/45; 95/55; 96/8; 96/10; 96/13; 96/14
(58) Field of Search ................. 95/45, 47–49, 95/51, 52, 55; 96/4, 8, 10, 12–14

(56) References Cited

U.S. PATENT DOCUMENTS

| | | | |
|---|---|---|---|
| 3,133,132 A | | 5/1964 | Loeb et al. |
| 3,308,107 A | | 3/1967 | Selman et al. |
| 3,488,335 A | | 1/1970 | Braun |
| 3,865,845 A | | 2/1975 | Resnick |
| 3,980,456 A | | 9/1976 | Browall |
| 4,230,463 A | | 10/1980 | Henis et al. |
| 4,243,701 A | | 1/1981 | Riley et al. |
| 4,399,264 A | | 8/1983 | Squire |
| 4,431,786 A | | 2/1984 | Squire |
| 4,486,202 A | | 12/1984 | Malon et al. |
| 4,565,855 A | | 1/1986 | Anderson et al. |
| 4,594,399 A | | 6/1986 | Anderson et al. |
| 4,654,055 A | | 3/1987 | Malon et al. |
| 4,728,345 A | | 3/1988 | Murphy |
| 4,754,009 A | | 6/1988 | Squire |
| 4,767,422 A | | 8/1988 | Bikson et al. |
| 4,813,983 A | | 3/1989 | Nohmi et al. |
| 4,880,442 A | | 11/1989 | Hayes |
| 4,897,457 A | | 1/1990 | Nakamura et al. |
| 4,910,276 A | | 3/1990 | Nakamura et al. |
| 4,931,181 A | | 6/1990 | Blume et al. |
| 4,963,165 A | | 10/1990 | Blume et al. |
| 5,021,602 A | | 6/1991 | Clement et al. |
| 5,051,114 A | | 9/1991 | Nemser et al. |
| 5,085,776 A | * | 2/1992 | Blume et al. .......... 210/500.27 |
| 5,091,216 A | | 2/1992 | Ekiner et al. |
| 5,117,272 A | | 5/1992 | Nomura et al. |
| 5,131,927 A | | 7/1992 | Bikson et al. |
| 5,141,642 A | | 8/1992 | Kusuki et al. |
| 5,268,411 A | | 12/1993 | Yokotsuka et al. |
| 5,288,304 A | | 2/1994 | Koros et al. |
| 5,407,466 A | | 4/1995 | Lokhandwala et al. |
| 5,498,682 A | | 3/1996 | Navarrini et al. |
| 5,510,406 A | | 4/1996 | Matsuo et al. |
| 5,710,345 A | | 1/1998 | Navarrini et al. |
| 5,769,926 A | * | 6/1998 | Lokhandwala et al. ........ 95/39 |
| 5,772,733 A | * | 6/1998 | Lokhandwala et al. ........ 95/39 |
| 5,883,177 A | | 3/1999 | Colaianna et al. |
| 5,962,612 A | | 10/1999 | Takakura et al. |
| 5,964,923 A | * | 10/1999 | Lokhandwala ................. 95/50 |
| 6,011,192 A | | 1/2000 | Baker et al. |
| 6,040,419 A | | 3/2000 | Drysdale et al. |
| 6,350,371 B1 | | 2/2002 | Lokhandwala et al. |
| 6,361,582 B1 | | 3/2002 | Pinnau et al. |
| 6,361,583 B1 | | 3/2002 | Pinnau et al. |
| 6,425,267 B1 | * | 7/2002 | Baker et al. .................. 62/624 |
| 6,544,316 B2 | | 4/2003 | Baker et al. |
| 6,572,680 B2 | | 6/2003 | Baker et al. |
| 6,579,341 B2 | | 6/2003 | Baker et al. |
| 6,592,650 B2 | * | 7/2003 | Pinnau et al. .................. 95/47 |
| 6,630,011 B1 | * | 10/2003 | Baker et al. .................... 95/47 |
| 6,648,944 B1 | * | 11/2003 | Baker et al. .................... 95/39 |
| 2002/0104435 A1 | * | 8/2002 | Baker et al. .................... 95/45 |
| 2002/0124722 A1 | * | 9/2002 | Baker et al. .................... 95/45 |
| 2002/0170430 A1 | * | 11/2002 | Baker et al. .................... 95/45 |
| 2003/0033929 A1 | * | 2/2003 | Pinnau et al. ................... 95/45 |
| 2004/0003714 A1 | * | 1/2004 | Bikson et al. .................. 95/45 |
| 2004/0159233 A1 | * | 8/2004 | Simmons et al. .............. 95/45 |

FOREIGN PATENT DOCUMENTS

EP 0649676 4/1995

OTHER PUBLICATIONS

F. G. Russell, "Operating Permeations Systems," Hydrocarbon Processing, vol. 62, pp. 55–56, (1983).
J. M. S. Henis, "Comm. and Practical Aspects of . . . ," in Polymeric Gas Sep Membranes, p. 474–477, 580–584, Paul and Yampol'skii (Eds.), CRC Press, Boca Raton, FL (1994).
V. Arcella et al., "A Study on a Perfluoropolymer Purification and Its Application to Membrane Formation" J. Memb. Sci. 163, pp. 203–209 (1999).
I. Pinnau et al., "Gas and Vapor Transport Properties of Amorphous Perfluorinated Copolymer Membranes . . . " J. Memb. Sci. 109, pp. 125–133 (1996).
A. Y. Alentiev et al., "High Transport Parameters and Free Volume of Perfluorodioxole Copolymers," J. Memb. Sci. 126, pp. 123–132 (1997).

* cited by examiner

Primary Examiner—Robert H. Spitzer
(74) Attorney, Agent, or Firm—J. Farrant

(57) ABSTRACT

A membrane-based process for separating mixtures of target gases if the gas mixture also contains $C_{3+}$ hydrocarbon vapors. The process uses gas-separation membranes having a base membrane and a coating layer. The base membrane incorporates a selective layer made from a polymer selective between the light gases to be separated. The coating layer comprises a fluorinated polymer capable of protecting the base membrane from $C_{3+}$ hydrocarbon vapors and liquids.

45 Claims, 12 Drawing Sheets

GAS SEPARATION USING COATED MEMBRANES

This application claims the benefit of U.S. Provisional Application Ser. No. 60/394,112, filed Jul. 5, 2002 and incorporated herein by reference.

FIELD OF THE INVENTION

The invention relates to the membrane separation of gases that are not $C_{3+}$ hydrocarbons from gas mixtures containing $C_{3+}$ hydrocarbons. In particular, the invention relates to the separation of hydrogen from methane and carbon dioxide from methane. The separation is carried out using hydrocarbon-resistant membranes, and is useful in refineries, petrochemical plants, natural gas treatment plants and the like.

BACKGROUND OF THE INVENTION

Polymeric gas-separation membranes are well known and are in use in such areas as production of oxygen-enriched air, production of nitrogen from air, separation of carbon dioxide from methane, hydrogen recovery from various gas mixtures and removal of organic vapors from air or nitrogen.

The preferred membrane for use in any gas-separation application combines high selectivity with high flux. Thus, the membrane-making industry has engaged in an ongoing quest for polymers and membranes with improved selectivity/flux performance. Many polymeric materials are known that offer intrinsically attractive properties. That is, when the permeation performance of a small film of the material is measured under laboratory conditions, using pure gas samples and operating at modest temperature and pressure conditions, the film exhibits high permeability for some pure gases and low permeability for others, suggesting useful separation capability.

Unfortunately, gas separation in an industrial plant is seldom so simple. The gas mixtures to which the separation membranes are exposed may be hot, contaminated with solid or liquid particles, or at high pressure, may fluctuate in composition or flow rate or, more likely, may exhibit several of these features. In gas mixtures that contain condensable components, such as $C_{3+}$ hydrocarbons, it is frequently the case that the mixed gas selectivity is lower, and at times considerably lower, than the ideal selectivity. The condensable component, which is readily sorbed into the polymer matrix, swells or, in the case of a glassy polymer, plasticizes the membrane, thereby reducing its selective capabilities.

A good example of these performance problems is the separation of hydrogen from mixtures containing hydrogen, methane and other hydrocarbons in refineries and petrochemical plants. The principal technologies available to recover hydrogen from these gas mixtures are cryogenic separation, pressure swing adsorption (PSA), and membrane separation. Membrane gas separation, the newest, is based on the difference in permeation rates of gas components through a selective membrane. Many membrane materials are much more permeable to hydrogen than to other gases and vapors. One of the first applications of gas separation membranes was recovery of hydrogen from ammonia plant purge streams, which contain hydrogen and nitrogen. This is an ideal application for membrane technology, because the membrane selectivity is high, and the feed gas is clean (free of contaminants, such as heavier hydrocarbons). Another successful application is to adjust hydrogen/carbon monoxide or hydrogen/methane ratios for synthesis gas production. Again, the feed gas is free of heavy hydrocarbon compounds.

Application of membranes to refinery separation operations has been much less successful. Refinery gas streams contain contaminants such as water vapor, acid gases, olefins, aromatics, and other hydrocarbons. At relatively low concentrations, these contaminants cause membrane plasticization and loss of selectivity. At higher concentrations they can condense on the membrane and cause irreversible damage to it.

When a feedstream containing such components and hydrogen is introduced into a membrane system, the hydrogen is removed from the feed gas into the permeate and the gas remaining on the feed side becomes progressively enriched in hydrocarbons, raising the dewpoint. For example, if the total hydrocarbon content increases from 60% in the feed gas to 85% in the residue gas, the dewpoint may increase by as much as 25° C. or more, depending on hydrocarbon mix.

Maintaining this hydrocarbon-rich mixture as gas may require it to be maintained at high temperature, such as 60° C., 70° C., 80° C. or even higher, which is costly and may itself eventually adversely affect the mechanical integrity of the membrane. Failure to do this means the hydrocarbon stream may enter the liquid-phase region of the phase diagram before it leaves the membrane module, and condense on the membrane surface, damaging it beyond recovery.

Even if the hydrocarbons are kept in the gas phase, separation performance may fall away completely in the presence of hydrocarbon-rich mixtures. These issues are discussed, for example, in J. M. S. Henis, "Commercial and Practical Aspects of Gas Separation Membranes" Chapter 10 of D. R. Paul and Y. P. Yampol'skii, *Polymeric Gas Separation Membranes*, CRC Press, Boca Raton, 1994. This reference gives upper limits on various contaminants in streams to be treated by polysulfone membranes of 50 psi hydrogen sulfide, 5 psi ammonia, 10% saturation of aromatics, 25% saturation of olefins and 11° C. above paraffin dewpoint (pages 473–474).

Similarly, F. G. Russell, "Operating permeation systems", *Hydrocarbon Processing*, Vol. 62, pages 55–56 (1983) recommends that the vapor pressure of water in the gas in contact with the membrane should not exceed 85% of saturation at the temperature of the process, and that the partial pressure of organics such as aromatics, alcohols, ketones and chlorinated solvents should not be more than 10% of the saturation vapor pressure.

A great deal of research has been performed on improved membrane materials for hydrogen separation. A number of these materials appear to have significantly better properties than the original cellulose acetate or polysulfone membranes. For example, modern polyimide membranes have been reported with selectivity for hydrogen over methane of 50 to 200, as in U.S. Pat. Nos. 4,880,442 and 5,141,642.

Unfortunately, these materials remain susceptible to severe loss of performance through plasticization and to catastrophic collapse if contacted by liquid hydrocarbons. Several failures have been reported in refinery applications where these conditions occur. This low process reliability has caused a number of process operators to discontinue applications of membrane separation for hydrogen recovery.

Another example of an application in which membranes have difficulty delivering and maintaining adequate performance is the removal of carbon dioxide from natural gas. Natural gas provides more than one-fifth of all the primary energy used in the United States, but much raw gas is "subquality", that is, it exceeds the pipeline specifications in nitrogen, $C_{3+}$ hydrocarbons, carbon dioxide and/or hydrogen sulfide content. About 10% of gas contains excess carbon dioxide.

Membrane technology is intrinsically attractive for removing this carbon dioxide, because many membrane materials are very permeable to carbon dioxide, and because treatment can be accomplished using the high wellhead gas pressure as the driving force for the separation. However, carbon dioxide readily sorbs into and interacts strongly with many polymers, and in the case of gas mixtures such as carbon dioxide/methane with other components, the expectation is that the carbon dioxide at least will have a swelling or plasticizing effect, thereby adversely changing the membrane permeation characteristics.

These issues are again discussed in the Henis reference cited above. Such problems are exacerbated when $C_{3+}$ hydrocarbons are also present in the stream.

In the past, cellulose acetate, which can provide a carbon dioxide/methane selectivity of about 10–20 in gas mixtures at pressure, has been the membrane material of choice for this application, and about 100 plants using cellulose acetate membranes are believed to have been installed.

Nevertheless, cellulose acetate membranes are not without problems. Natural gas often contains substantial amounts of water, either as entrained liquid, or in vapor form, which may lead to condensation within the membrane modules. However, contact with liquid water can cause the membrane selectivity to be lost completely, by swelling the membrane to the point that it loses mechanical strength and collapses, and exposure to water vapor at relative humidities greater than about 20–30% can cause irreversible membrane compaction and loss of flux. The presence of hydrogen sulfide in conjunction with water vapor is also damaging, as are high levels of $C_{3+}$ hydrocarbons. These issues are discussed in more detail in U.S. Pat. No. 5,407,466, columns 2–6, which patent is incorporated herein by reference.

Thus, the need remains for membranes that will provide and maintain adequate performance under the conditions of exposure to hydrocarbons, and particularly $C_{3+}$ hydrocarbons, that are commonplace in refineries, chemical plants, or gas fields.

For many gas separations, to obtain good selectivity requires the use of amorphous glassy polymer materials. These materials, however, tend to be fairly impermeable compared with rubbery or elastomeric polymers, so very thin selective layers are needed to provide adequate transmembrane flux of the permeating gases.

During the early years of gas separation membranes, many problems were encountered in providing a selective layer that was thin, yet free of small pores, pinholes or other defects that would diminish or destroy the separation capabilities. The literature from the 1980s contains many patents from Monsanto and others describing surface treatments or coatings that could heal or seal defects or plug pores to prevent unselective bulk flow of gas. When the treatment or coating was successful, significant increase in selectivity compared with that obtained by the uncoated/untreated base membrane was achieved.

Pioneering patents that describe these efforts include U.S. Pat. No. 3,980,456 to Browall of General Electric, and U.S. Pat. No. 4,230,463 to Henis and Tripodi, of Monsanto. In U.S. Pat. No. 4,230,463, occluding coatings of highly permeable rubbery materials, such as silicone rubber, are applied to enter and plug pores in asymmetric glassy polymer membranes. The unplugged membranes are, in some cases, completely unselective for certain gas pairs. When treated, the plugged membranes exhibit selectivity for the same gas pair that approaches the intrinsic selectivity of the membrane polymer. Other patents that concern sealing of defects in the selective layer or otherwise changing the properties of the selective layer include U.S. Pat. Nos. 4,486,202 and 4,654,055 to Malon et al., of Monsanto, U.S. Pat. Nos. 4,767,422 and 5,131,927 to Bikson et al., of Union Carbide, and U.S. Pat. No. 5,091,216 to Ekiner et al., of Du Pont.

A more recent reference in the same vein is European Patent Application 0 649 676 A1, to L'Air Liquide. This reference takes advantage of a newly developed, high-free-volume (and hence highly permeable) fluoropolymer, Teflon AF®, and discloses post-treatment of gas separation membranes by applying a layer of such material to seal holes or other defects in the membrane surface. A similar approach is taken in U.S. Pat. No. 5,288,304, to Koros and Jones of the University of Texas, which describes the use of polymeric coatings on microporous carbon molecular sieves to plug the pores. In this case, the goal is not to seal defects, but to prevent water, oil or other hydrocarbons from entering the pores of the sieve. No permeation data for gas mixtures containing $C_{3+}$ hydrocarbons are given.

It is also known to apply a top coating to gas separation membranes to protect the membranes from abrasion or impact during module preparation and in subsequent use, as mentioned in U.S. Pat. No. 4,813,983. This patent also mentions that a top coating layer can protect membranes from liquid contact.

None of the above references addresses the problem of loss of performance caused by plasticization of polymeric membranes when exposed to $C_{3+}$ hydrocarbon vapors.

U.S. Pat. No. 4,728,345, to Murphy of Monsanto, describes the application of a rubbery polyphosphazene coating to porous separation membranes, following the occluding or pore-plugging approach of '463. The result is again a dramatic increase in selectivity for gas pairs such as hydrogen/methane and carbon dioxide/methane. The patent also claims that the polyphosphazene coating provides stability for the membrane if aliphatic or aromatic hydrocarbons are present in the feed gas. However, no permeation data for gas streams containing such hydrocarbons are given.

Films or membranes made from fluorinated polymers having a ring structure in the repeat unit, in which the fluorinated polymer provides selective capabilities are known. For example:

1. U.S. Pat. Nos. 4,897,457 and 4,910,276, both to Asahi Glass, disclose various perfluorinated polymers having repeating units of perfluorinated cyclic ethers, and cite the gas-permeation properties of certain of these, as in column 8, lines 48–60 of U.S. Pat. No. 4,910,276.
2. A paper entitled "A study on perfluoropolymer purification and its application to membrane formation" (V. Arcella et al., *Journal of Membrane Science*, Vol. 163, pages 203–209 (1999)) discusses the properties of membranes made from a copolymer of tetrafluoroethylene and a dioxole. Gas permeation data for various gases are cited.
3. U.S. Pat. No. 5,051,114, to Du Pont, discloses gas separation methods using perfluoro-2,2-dimethyl-1,3-dioxole polymer membranes. This patent also discloses comparative data for membranes made from perfluoro(2-methylene-4-methyl-1,3-dioxolane) polymer (Example XI).
4. A paper entitled "Gas and vapor transport properties of amorphous perfluorinated copolymer membranes based on 2,2-bistrifluoromethyl-4,5-difluoro-1,3-dioxole/ tetrafluoroethylene" (I. Pinnau et al., *Journal of Membrane Science*, Vol. 109, pages 125–133 (1996)) discusses the free volume and gas permeation properties of fluorinated dioxole/tetrafluoroethylene copolymers compared with substituted acetylene polymers. This reference also shows the susceptibility of this dioxole polymer to plasticization by organic vapors and the loss of selectivity as vapor partial pressure in a gas mixture increases (FIGS. 3 and 4).

5. U.S. Pat. Nos. 6,361,582 and 6,361,583, co-owned with the present application, describe gas separation processes in which a separation between $C_{3+}$ hydrocarbons and other gases is performed using composite membranes with fluorinated polymers as the selective layer.

SUMMARY OF THE INVENTION

The invention is a membrane-based process and a membrane for separating mixtures of target gases that are not $C_{3+}$ hydrocarbons and that are contained in a gas mixture that also contain $C_{3+}$ hydrocarbon vapors. Such a mixture might typically, but not necessarily, be found as a process or waste stream from a petrochemical plant or a refinery, or during treatment of natural gas.

The mixture is a multicomponent mixture, containing at least two target gases and at least one $C_{3+}$ hydrocarbon vapor, and typically additional gases. The goal of the process is to separate one of the non-$C_{3+}$ hydrocarbon-gases, that is, light gases, from another of the light gases.

Many separations fall within the scope of the invention. Representative examples include:

Separation of hydrogen from methane, ethane or ethylene

Separation of carbon dioxide and/or hydrogen sulfide from methane, ethane or ethylene.

A commonly encountered and typical representative example is the separation of hydrogen from methane. In the interests of clarity and simplicity, therefore, our process is described herein principally as it relates to hydrogen/methane separation. However, this is intended to avoid long and complicated lists of equivalents whenever process streams are discussed, and is not intended to limit the scope of the process. Those of skill in the art will readily appreciate how to apply the process of the invention to other gas mixtures, such as hydrogen/ethane, hydrogen/carbon monoxide, carbon dioxide/methane, carbon dioxide/ethane, carbon dioxide/ethylene and hydrogen sulfide/methane, by following the exemplary teachings specific to hydrogen/methane that are given herein.

The separation is carried out by running a stream of the gas mixture across a membrane that is selective for hydrogen over methane. The process results, therefore, in a permeate stream enriched in hydrogen and a residue stream depleted in hydrogen.

The process differs from processes previously available in the art in that:

(i) the membranes are able to provide useful hydrogen/methane separation properties for gas mixtures containing $C_{3+}$ hydrocarbon vapors, even at high levels, in the gas mixture, and (ii) the membranes can recover from accidental exposure to liquid organic compounds.

To provide these attributes, the membranes used in the process comprise a base membrane, and a $C_{3+}$ hydrocarbon-resistant polymeric coating.

The base membrane includes a selective layer made from a polymer that has a hydrogen/methane selectivity that is higher than the hydrogen/methane selectivity of the coating polymer. The selective layer may be the skin layer of an integral asymmetric membrane, or may be a layer of different chemical structure deposited or formed on an underlying support membrane. Suitable materials for the selective layer include polyimides, polysulfone, cellulose acetate and many others.

The $C_{3+}$ hydrocarbon-resistant coating layer is made from a polymer or copolymer that has permeability for both hydrogen and methane that is higher than the corresponding hydrogen and methane permeabilities of the selective layer polymer. The coating layer polymer also has a permeability for $C_{3+}$ hydrocarbons that is low compared to its permeabilities for hydrogen and methane.

The coating polymer is typically characterized by a fractional free volume no greater than about 0.3 and preferably by a glass transition temperature, Tg, of at least about 100° C. Further, the polymer has repeating units of a fluorinated, cyclic structure, the ring having at least five members, or a fluorine:carbon ratio of at least 1:1.

Various materials may be used for the coating layer to meet the above requirements. These include, but are not limited to, polymers comprising a fluorinated dioxole monomer or a fluorinated dioxolane monomer, and amorphous copolymers of tetrafluoroethylene. Particularly preferred materials are copolymers of a fluorinated dioxole with tetrafluoroethylene. However, copolymers of a very high fractional free volume are not suitable, as discussed in more detail below.

In addition to the selective layer and the coating layer, the membranes normally include a microporous support layer underlying the selective layer. Optionally, they may also include gutter or sealing layers between the support layer and the selective layer, as well as additional sealing or protective layers between the selective layer and the $C_{3+}$ hydrocarbon-resistant coating layer, or on top of the $C_{3+}$ hydrocarbon-resistant coating layer.

In a basic embodiment, the process of the invention includes the following steps:

(a) providing a membrane having a feed side and a permeate side and comprising;
  (i) a base membrane comprising a selective layer of a first polymer on the feed side, and
  (ii) a $C_{3+}$ hydrocarbon-resistant coating layer of a second polymer coating the base membrane on the feed side;
wherein, when measured under the same conditions and in the absence of $C_{3+}$ hydrocarbons, the first polymer has a higher hydrogen/methane selectivity and a lower hydrogen permeability than the second polymer; and
wherein the second polymer has a fractional free volume no greater than about 0.3 and a glass transition temperature of at least about 100° C., and is chosen from the group consisting of (I) polymers comprising repeating units having a fluorinated cyclic structure of an at least 4-member ring and (II) polymers having a ratio of fluorine to carbon atoms in the polymer greater than 1:1;

(b) passing a gas mixture comprising hydrogen, methane and a $C_{3+}$ hydrocarbon across the feed side;

(c) providing a driving force for transmembrane permeation;

(d) withdrawing from the permeate side a permeate stream enriched in hydrogen compared to the gas mixture;

(e) withdrawing from the feed side a residue stream depleted in hydrogen compared to the gas mixture.

Likewise in a basic embodiment relating to carbon dioxide/methane separation, the process of the invention includes the following steps:

(a) providing a membrane having a feed side and a permeate side and comprising;

(i) a base membrane comprising a selective layer of a first polymer on the feed side, and
(ii) a $C_{3+}$ hydrocarbon-resistant coating layer of a second polymer coating the base membrane on the feed side;
wherein, when measured under the same conditions and in the absence of $C_{3+}$ hydrocarbons, the first polymer has a higher carbon dioxide/methane selectivity and a lower carbon dioxide permeability than the second polymer; and
wherein the second polymer has a fractional free volume no greater than about 0.3 and a glass transition temperature of at least about 100° C., and is chosen from the group consisting of (I) polymers comprising repeating units having a fluorinated cyclic structure of an at least 4-member ring and (II) polymers having a ratio of fluorine to carbon atoms in the polymer greater than 1:1;
(b) passing a gas mixture comprising carbon dioxide, methane and a $C_{3+}$ hydrocarbon across the feed side;
(c) providing a driving force for transmembrane permeation;
(d) withdrawing from the permeate side a permeate stream enriched in carbon dioxide compared to the gas mixture;
(e) withdrawing from the feed side a residue stream depleted in carbon dioxide compared to the gas mixture.

In a more general form, relating to the separation of first target gas from a second target gas, the process of the invention includes the following steps:
(a) providing a membrane having a feed side and a permeate side and comprising;
(i) a base membrane comprising a selective layer of a first polymer on the feed side, and
(ii) a $C_{3+}$ hydrocarbon-resistant coating layer of a second polymer coating the base membrane on the feed side;
wherein, when measured under the same conditions and in the absence of $C_{3+}$ hydrocarbons, the first polymer has a higher selectivity for the first gas over the second gas and a lower first gas permeability than the second polymer; and
wherein the second polymer has a fractional free volume no greater than about 0.3 and a glass transition temperature of at least about 100° C., and is chosen from the group consisting of (I) polymers comprising repeating units having a fluorinated cyclic structure of an at least 4-member ring and (II) polymers having a ratio of fluorine to carbon atoms in the polymer greater than 1:1;
(b) passing a gas mixture comprising the first gas, the second gas and a $C_{3+}$ hydrocarbon across the feed side;
(c) providing a driving force for transmembrane permeation;
(d) withdrawing from the permeate side a permeate stream enriched in the first gas compared to the gas mixture;
(e) withdrawing from the feed side a residue stream depleted in the first gas compared to the gas mixture.

Contrary to what would be expected from the data presented in the Pinnau et al. *Journal of Membrane Science* paper, we have unexpectedly found that membranes incorporating protective coatings formed from polymers as characterized above can withstand exposure to $C_{3+}$ hydrocarbons well enough to provide useful separation capability for other gases in gas mixtures that also include $C_{3+}$ hydrocarbon vapors. This resistance persists even when the $C_{3+}$ hydrocarbons are present at high levels, such as 5%, 10%, 15% or even more.

The membranes are also very resistant to plasticization by carbon dioxide, even at very high carbon dioxide partial pressures.

Prior to the present inventors' work, membranes made from fluorinated dioxoles were believed to behave like conventional membrane materials in suffering from debilitating plasticization in a hydrocarbon-containing environment, to the point that they may even become selective for hydrocarbons over permanent gas even at moderate $C_{3+}$ hydrocarbon partial pressures.

We have discovered that this is not the case for the coated membranes taught herein. This improvement is achieved because the coating material is a polymer with high permeabilities for both of the target gases to be separated, such as hydrogen and methane, but much lower permeabilities for the $C_{3+}$ hydrocarbons. Moreover, the coating material maintains these properties, even at very high vapor pressures of $C_{3+}$ hydrocarbons, approaching or even exceeding saturation, when the feed surface of the coating layer may be in direct contact with condensed liquid $C_{3+}$ hydrocarbons.

Thus, the coating material selectively permeates the gases to be separated by the underlying base membrane but permeates $C_{3+}$ hydrocarbons, which would degrade the base membrane, to a much lesser extent. In other words, although the polymer used for the coating layer has a lower selectivity for hydrogen over methane than the polymer used for the selective layer, it has a higher selectivity for both hydrogen over $C_{3+}$ hydrocarbons and methane over $C_{3+}$ hydrocarbons than the polymer used for the selective layer.

As a result, the selective layer is exposed to the hydrogen and methane that it is intended to separate, but is exposed to a $C_{3+}$ hydrocarbon activity level that is much lower than the activity level in the bulk gas.

These features distinguish the membranes and processes of the invention from all other membranes and processes previously used commercially for hydrogen separations.

These attributes render the membranes of the invention useful in situations where it was formerly difficult or impractical for membrane separation to be used, or where membrane lifetimes were poor.

The membrane may take any form, such as hollow fiber or flat sheet, and may be packaged in any convenient manner.

The driving force for permeation across the membrane is the pressure difference between the feed and permeate sides, which can be generated in a variety of ways. The pressure difference may be provided by compressing the feedstream, drawing a vacuum on the permeate side, or a combination of both. The membrane is able to tolerate high feed pressures, such as above 200 psia, 300 psia, 400 psia, 500 psia or more.

As mentioned above, the membrane is able to operate satisfactorily in the presence of $C_{3+}$ hydrocarbons and carbon dioxide at high levels. Thus the partial pressure of the hydrocarbons in the feed may be close to saturation. For example, depending on the mix of hydrocarbons and the temperature of the gas, the aggregate partial pressure of all $C_{3+}$ hydrocarbons in the gas might be as much as 10 psia, 15 psia, 25 psia, 50 psia, 100 psia, 200 psia or more. Expressed as a percentage of the saturation vapor pressure at that temperature, the partial pressure of hydrocarbons, particularly $C_{3+}$ hydrocarbons, may be 20%, 30%, 50%, 70%, 90% or more of saturation.

The carbon dioxide partial pressure may also be relatively high, such as 25 psia, 50 psia, 100 psia or above.

The membrane separation process may be configured in many possible ways, and may include a single membrane unit or an array of two or more units in series or cascade arrangements. The processes of the invention also include combinations of the membrane separation process defined above with other separation processes, such as adsorption, absorption, distillation, condensation or other types of membrane separation.

The scope of the invention in this aspect is not intended to be limited to any particular gas streams, but to encompass any situation where a multicomponent gas stream containing at least two target gases, such as hydrogen and methane or carbon dioxide and methane, is to be separated, and the stream also contains $C_{3+}$ hydrocarbons.

The composition of the gas may vary widely, from a mixture that contains minor amounts of hydrogen in admixture with various hydrocarbon components, including relatively heavy hydrocarbons, such as $C_5$–$C_8$ hydrocarbons or heavier, to a mixture of mostly hydrogen, such as 80% hydrogen, 90% hydrogen or above, with methane and other very light components, to an essentially binary mixture of hydrogen and methane with only very small amounts of other minor components.

Likewise, in separation of carbon dioxide from methane, the feed gas stream may contain from just a few percent carbon dioxide ranging up to 90% carbon dioxide or more, and the gas may also contain $C_{3+}$ hydrocarbons ranging from traces to close to or at saturation.

The process of the invention typically provides a selectivity, as measured with the gas mixture to be separated, even if the gas contains significant amounts of $C_{3+}$ hydrocarbon vapor, for hydrogen over methane of at least about 20. In many cases, depending on the selective material used and other conditions, much higher selectivity, such as 50, 100 or above is possible. For carbon dioxide/methane separations, typical selectivities of 10, 15 or higher are obtained.

In a second aspect, the invention is a gas-separation membrane. The membrane comprises a base membrane, which has the ability to separate a pair of target gases, such as hydrogen and methane, or carbon dioxide and ethylene, and a $C_{3+}$ hydrocarbon-resistant coating. The base membrane includes a selective layer that is principally responsible for the selective properties of the membrane with respect to the target gas pair and an underlying support membrane. The selective layer may be the skin layer of an integral asymmetric membrane, or may be a layer of different chemical structure deposited or formed on an underlying support membrane.

The selective layer is susceptible to plasticization by $C_{3+}$ hydrocarbon vapors. As a result, the base membrane exhibits different selectivities and pressure-normalized fluxes for target gas pairs depending on whether the measurements are made in the presence or absence of $C_{3+}$ hydrocarbons.

When the membrane is coated with the $C_{3+}$ hydrocarbon-resistant polymer layer, however, the selective layer is exposed to much lower activity levels of $C_{3+}$ hydrocarbons than in the bulk gas to be separated. Under these conditions, the membrane exhibits properties closer to, and approaching those, that can be obtained from the base membrane in the absence of $C_{3+}$ hydrocarbon vapors.

Since the coating layer protects the base membrane from exposure to $C_{3+}$ hydrocarbon vapors, it should form an essentially unbroken coating over the entirety of the base membrane surface on the feed side.

The coating layer material is chosen, in addition to its ability to reject $C_{3+}$ hydrocarbons, taking into account both its intrinsic selectivity and permeability compared to the selective layer material.

It is to be understood that the above summary and the following detailed description are intended to explain and illustrate the invention without restricting its scope.

DETAILED DESCRIPTION OF THE INVENTION

Figure 1:
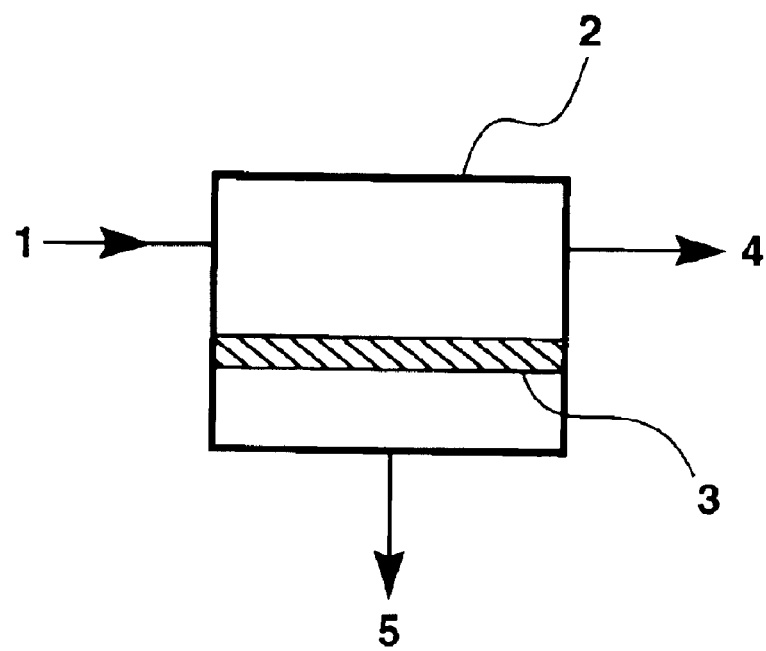
FIG. 1 is a schematic representation of the process of the invention in its most basic form.

The term gas as used herein means a gas or a vapor, and the terms are used interchangeably.

The terms target gas and light gas are used interchangeably herein and mean an inorganic gas or vapor, methane, or a $C_2$ hydrocarbon.

The terms hydrocarbon and organic vapor or organic compound are used interchangeably herein, and include, but are not limited to, saturated and unsaturated compounds of hydrogen and carbon atoms in straight chain, branched chain and cyclic configurations, including aromatic configurations, as well as compounds containing oxygen, nitrogen, halogen or other atoms.

The term $C_{3+}$ hydrocarbon means a hydrocarbon having at least three carbon atoms.

The term light hydrocarbon means a hydrocarbon molecule having no more than about six carbon atoms.

The term heavier hydrocarbon means a $C_{3+}$ hydrocarbon.

The term selectivity as used herein means the selectivity as measured with the mixed gases and with elevated pressure on the feed side and atmospheric pressure on the permeate side of the membrane or film used to make the measurements.

The term intrinsic selectivity as used herein means the selectivity expressed as the ratio of the permeabilities of two gases measured individually with the pure gases at a temperature of 25° C.

When streams are referred to as containing $C_{3+}$ hydrocarbons, or a step is said to be carried out in the presence of $C_{3+}$ hydrocarbons, it is meant that the stream or streams in question contains more than trace amounts of $C_{3+}$ hydrocarbons, that is, at least about 0.5% $C_{3+}$ hydrocarbons.

When streams are referred to as free or essentially free of $C_{3+}$ hydrocarbons, or a step is said to be carried out in the absence of $C_{3+}$ hydrocarbons, is meant that the stream or streams in question contain no more than about 0.5% $C_{3+}$ hydrocarbons.

All percentages herein are by volume unless otherwise stated.

The invention is a process for separating non-$C_{3+}$ hydrocarbon gases from each other, in the presence of $C_{3+}$ hydrocarbon vapors. The separation is carried out by running a stream of the gas mixture containing the target gases and $C_{3+}$ hydrocarbon across a membrane that is selective for a first gas over a second gas in the mixture. The process results, therefore, in a permeate stream enriched in the first gas and a residue stream depleted in the first gas.

The non-$C_{3+}$ hydrocarbon gases that may be separated from one another using the process of the invention are limited only by the availability of selective layer polymers having appropriate selectivity for the two target gases. Gases that may be separated from one another include, but are not limited to, hydrogen, helium, oxygen, nitrogen, argon and other inert gases, carbon dioxide, hydrogen sulfide and other acid gases, carbon monoxide, water vapor, $C_1$–$C_3$ light hydrocarbons, $NO_x$, $SO_x$ and so on.

Since a limited number of selective polymers are known, not every gas pair that can be drawn from the list will be amenable to separation by the process of the invention. For example, materials that are selective for nitrogen over methane are rare, and to the inventors' knowledge, the best and most selective materials that have been discovered to date are, in fact, the same types of fluoropolymer that are used in the present invention for the coating layer. Thus those desiring to separate nitrogen from methane in the presence of $C_{3+}$ hydrocarbons would be better advised to use a membrane having a selective layer of the presently defined fluoropolymer, as taught in co-owned U.S. Pat. Nos. 6,361,582; 6,361,583; and 6,579,341.

For gas pairs for which membranes made from polysulfone, cellulose acetate, polycarbonate, polyimide, polyaramid and other known selective polymers are useful, however, the invention provides for the first time a separation process that will perform reliably in a hydrocarbon-rich environment. Several gas pairs and separations in particular may be called out by way of representative example:

Hydrogen from methane, ethane or ethylene.

As mentioned above, such streams are found in refineries and petrochemical plants as process and waste gas streams. $C_3$–$C_8$ hydrocarbons are also commonly present in the raw streams. Currently much hydrogen-containing gas is passed to the fuel header in such facilities because no economical hydrogen-recovery technique has been available.

Carbon dioxide and/or hydrogen sulfide from methane, ethane or ethylene.

Such streams occur in many natural gas fields. Gas streams to be treated also contain $C_3$–$C_6$ and sometimes heavier hydrocarbons, as well as BTEX aromatics. Carbon-dioxide-laden streams also occur during processing of feedstocks and products for steam crackers used to make ethylene from light paraffins, and in recycle streams in the production of vinyl acetate, isopropanol, ethylene oxide, propylene oxide and acetaldehyde.

As was the case in the Summary section above, for ease of understanding, simplicity and convenience, the invention is now described in a representative manner as it pertains to hydrogen/methane separation. Those of skill in the art will readily be able to apply the teachings herein to the other gas pairs highlighted above, such as carbon dioxide/methane, as well as to other gas pairs for which selective polymer materials are available, with no more than routine experimentation.

The process of the invention in its most basic form is shown in FIG. 1. Referring to this figure, a feed stream, 1, comprising a gas mixture including hydrogen, methane and at least one $C_{3+}$ hydrocarbon vapor, is passed into membrane separation unit 2 and flows across the feed side of membrane 3. Under a pressure difference between the feed and permeate sides of the membrane, hydrogen passes preferentially to the permeate side, and hydrogen-enriched stream, 5, is withdrawn from the permeate side. The remaining hydrogen-depleted residue stream, 4, is withdrawn from the feed side. The permeate stream or the residue stream, or both, may be useful products of the process.

The process differs from previous hydrogen/methane separation processes in the nature of the membrane, 3, that is used. The membranes are, as described above, able to maintain useful separation properties in the presence of $C_{3+}$ hydrocarbon vapors at high partial pressure, and able to recover from accidental or deliberate exposure to liquid hydrocarbons.

To provide these attributes, the membranes used in the process comprise a base membrane, and a $C_{3+}$ hydrocarbon-resistant polymeric coating. The membrane is shown in a very simple schematic form in FIG. 2, where the membrane overall is indicated by the numeral 10, and includes base membrane, 11, and $C_{3+}$ hydrocarbon-resistant coating, 12.

The base membrane includes a support layer, 13, and a selective layer, 14. Within this general structure, the base membrane may be of any type or construction method known in the art, such as an integral asymmetric membrane, a composite having a selective layer formed in situ by interfacial polymerization, plasma polymerization, or surface modification of some sort, or a composite formed by coating the selective layer onto the support by solution coating or other means.

Materials and methods for making all such types of membrane are well known in the art.

Integral asymmetric membranes comprise an extremely thin, dense skin on a substructure of graded porosity, being very finely microporous adjacent to the skin and more openly porous in the underlying region. The phase-inversion process by which such membranes are made was originally developed by Loeb and Sourirajan to make reverse osmosis membranes and is described In U.S. Pat. No. 3,133,132 to Loeb. The preparation of integral asymmetric membranes for gas separation is now conventional in the art and is described, for example, in U.S. Pat. No. 4,230,463 to Hems and Tripodi. Membranes of this type suitable for separating gas pairs from the list above may be made from a number of materials familiar to those of skill in the art, such as, but not limited to, polysulfone, cellulose acetate, palyaniide, polyaramid, polyimide, polyetherimide, polyester, polycarbonate, polyvinylidene fluoride, polypropylene, polyethylene or polytetrafluoroethylene.

Such membranes may also include a sealing layer as taught in U.S. Pat. No. 4,230,463 and elsewhere to plug pores and other defects in the selective skin layer.

Modern composite gas-separation membranes, such as are made by Membrane Technology and Research, Inc. of Menlo Park, Ca., typically comprise a highly permeable but relatively non-selective support membrane, which provides mechanical strength, coated with a thin selective layer of another material that is primarily responsible for the separation properties.

Typically, but not necessarily, such a composite membrane is made by solution-casting the support membrane, then solution-coating the selective layer. General preparation techniques for making composite membranes of this type are well known, and are described, for example, in U.S. Pat. No. 4,243,701 to Riley et al., incorporated herein by reference, and in U.S. Pat. Nos. 4,931,181 and 4,963,165 to MTR.

The microporous support membrane should have a flow resistance that is very small compared to the permselective layer. Preferred support membranes are asymmetric, having a finely porous skin layer, such as are manufactured for ultrafiltration purposes. The making of such membranes is well known in the art. Preferably the pores in the skin layer should be less than 1 micron in diameter, to enable it to be coated with a defect-free permselective layer. In general, porous support membranes may be made from the same types of glassy polymers used to make integral asymmetric gas-separation membranes, including polysulfone, polyamide, polyimide, polyetherimide, polyvinylidene fluoride and so on.

Since the membrane is to be used in a chemically challenging environment, it is preferred to use a fluorinated or perfluorinated polymer, such as polyvinylidene fluoride, to make the microporous support membrane.

The support membrane may itself be reinforced by casting it on a fabric or paper web.

As an alternative to coating onto a support membrane, it is also possible in some circumstances to make a composite membrane by solution-casting the selective polymer layer directly onto a reinforcing backing web, as mentioned above.

As with the integral asymmetric gas separation membranes, the composite membranes may include additional layers, such as a gutter layer between the microporous support membrane and the selective layer, or a sealing layer on top of the selective layer. A gutter layer generally has two purposes. The first is to coat the support with a material that seals small defects in the support surface, and itself provides a smooth, essentially defect-free surface onto which the selective layer may be coated. The second is to provide a layer of highly permeable material that can channel permeating molecules to the relatively widely spaced pores in the support layer. The sealing layer protects the thin permselective layer.

Suitable materials for gutter and sealing layers are high permeability polymers, such as silicone rubber or Teflon AF®, a very high free volume perfluorodioxole disclosed in U.S. Pat. No. 5,051,114 and available commercially from DuPont Fluoroproducts of Wilmington, Del.

In any of the types of base membrane, multiple selective layers, 14, may also be used if desired.

The membrane, 10, includes a $C_{3+}$ hydrocarbon-resistant coating, 12, coating base membrane 11, on the side that will be exposed to the feed gas. As explained briefly above, the $C_{3+}$ hydrocarbon-resistant coating layer is made from a polymer or copolymer that has a higher permeability for both hydrogen and methane (or carbon dioxide and methane, or other target gases to be separated) than for $C_{3+}$ hydrocarbons.

In other words, it is selective for hydrogen over $C_{3+}$ hydrocarbons and for methane over $C_{3+}$ hydrocarbons, and this selectivity is maintained even at high partial pressures of $C_{3+}$ hydrocarbons.

The coating polymer is typically characterized by a fractional free volume no greater than about 0.3 and preferably by a glass transition temperature, Tg, of at least about 100° C. Further, the polymer has repeating units of a fluorinated, cyclic structure, the ring having at least four, more preferably at least five members, or a fluorine:carbon ratio of at least 1:1.

Preferably, the polymer is perfluorinated.

Various materials may be used for the coating layer to meet the above requirements. The materials are not new in themselves. In fact, general polymer formulations embracing those suitable for use in the invention are described in patents dating back from the present day to the 1960s, for example, U.S. Pat. Nos. 3,308,107; 3,488,335; 3,865,845; 4,399,264; 4,431,786; 4,565,855; 4,594,399; 4,754,009; 4,897,457; 4,910,276; 5,021,602; 5,117,272; 5,268,411; 5,498,682; 5,510,406; 5,710,345; 5,883,177; 5,962,612; and 6,040,419.

The ring structure within the repeat units may be aromatic or non-aromatic, and may contain other atoms than carbon, such as oxygen atoms. Preferred polymers for the selective layer of the membrane are formed from fluorinated monomers of (i) dioxoles, which are five-member rings of the form

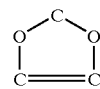

that polymerize by opening of the double bond, or (ii) dioxolanes, similar five-member rings but without the double bond in the main ring.

Not all polymers within the above structural definitions and preferences are suitable for use as membrane coating layers in the invention. For example, certain of the polymers and copolymers of perfluoro-2,2-dimethyl-1,3-dioxole reported in U.S. Pat. No. 5,051,114 have been shown to be susceptible to plasticization to the point of switching from being selective for nitrogen over hydrocarbons to being selective for hydrocarbons over nitrogen as the hydrocarbon partial pressure increases.

These polymers are, however, characterized by very high fractional free volume within the polymer, typically above 0.3. For example, a paper by A. Yu. Alentiev et al, "High transport parameters and free volume of perfluorodioxole copolymers", *Journal of Membrane Science*, Vol. 126, pages 123–132 (1997) reports fractional free volumes of 0.32 and 0.37 for two grades of perfluoro-2,2-dimethyl-1,3-dioxole copolymers (Table 1, page 125). Likewise, these polymers are of low density compared with other polymers, such as below about 1.8 g/cm³ and are unusually gas permeable, for instance exhibiting pure gas permeabilities as high as 1,000 Barrer or more for oxygen and as high as 2,000 Barrer or more for hydrogen.

It is believed that polymers with denser chain packing, and thus lower fractional free volume, higher density and lower permeability, are more resistant to plasticization. Hence, the polymers used in the invention to form the coating layer of the membrane should preferably be limited, in addition to the specific structural limitations defined and discussed above, to those having a fractional free volume less than about 0.3.

In referring to fractional free volume (FFV), we mean the free volume per unit volume of the polymer, defined and calculated as:

$$FFV = SFV/v_{sp}$$

where SFV is the specific free volume, calculated as:

$$SFV = v_{sp} - v_0 = v_{sp} - 1.3\, v_w$$

and where:

$v_{sp}$ is the specific volume (cm³/g) of the polymer determined from density or thermal expansion measurements, $v_0$ is the zero point volume at 0° K., and $v_w$ is the van der Waals volume calculated using the group contribution method of Bondi, as described in D. W. van Krevelan, *Properties of Polymers*, 3$^{rd}$ Edition, Elsevier, Amsterdam, 1990, pages 71–76.

Expressed in terms of density, the coating layer polymers should preferably have a density above about 1.5 g/cm³.

Expressed in terms of permeability, the coating layer polymers will generally exhibit a propane permeability (as measured with pure propane at 25° C.) no higher than about 20 Barrer, and more preferably no higher than about 10 Barrer. For n-butane or heavier hydrocarbons, the permeability should preferably be much lower still, such as no more than about 5 Barrer, and more preferably no more than about 1 or 2 Barrer.

On the other hand, the coating layer polymers will generally exhibit high permeability in favor of the gases to be separated, such as a hydrogen permeability of at least about 50 Barrer and a carbon dioxide permeability of at least about 5 Barrer.

The polymers are preferably rigid and glassy during operation, in which case they should have glass transition temperatures comfortably above temperatures to which they are typically exposed during the process. Polymers with glass transition temperature above about 100° C. are preferred, and, subject also to the other requirements and preferences above, the higher the glass transition temperature, in other words, the more rigid the polymer, the more preferred it is.

The polymers should preferably take amorphous, rather than crystalline form, because crystalline polymers are typically essentially insoluble and thus render membrane making difficult, as well as exhibiting low gas permeability.

As stated above, the polymers are fluorinated. More preferably, they have a fluorine:carbon ratio of atoms in the polymer of at least about 1:1, and most preferably, they are perfluorinated.

The polymers may be homopolymers of the repeating units of fluorinated cyclic structures defined above. Optionally, they may be copolymers of such repeat units with other polymerizable repeat units. For preference, these other repeat units should be at least partially fluorinated, and most preferably heavily fluorinated or perfluorinated. A number of suitable materials are known, for example, fluorinated ethers, ethylene and propylene.

Particularly when perfluorinated, homopolymers made from these materials, such as polytetrafluoroethylene (PTFE) and the like, are very resistant to plasticization. However, they tend to be crystalline or semi-crystalline and to have gas permeabilities too low for any useful separation application. As constituents of copolymers with the fluorinated ring structures defined above, however, they can produce materials that combine amorphous structure, good permeability and good resistance to plasticization. Copolymers that include tetrafluoroethylene units are particularly preferred. Other specific examples of copolymers that are suitable are polyhexafluoropropylene and chlorofluoro ethylenes and propylene.

Specific most preferred materials are copolymers of tetrafluoroethylene with 2,2,4-trifluoro-5-trifluoromethoxy-1,3-dioxole having the structure:

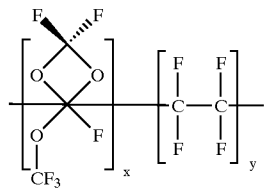

where x and y represent the relative proportions of the dioxole and the tetrafluoroethylene blocks, such that x+y=1.

Such materials are available commercially from Solvay Solexis, Thorofare, N.J., under the trade name Hyflon® AD. Different grades are available varying in proportions of the dioxole and tetrafluoroethylene units, with fluorine:carbon ratios of between 1.5 and 2, depending on the mix of repeat units. For example, grade Hyflon® AD 60 contains a 60:40 ratio of dioxole to tetrafluoroethylene units, has a fractional free volume of 0.23, a density of 1.93 g/cm³ and a glass transition temperature of 121° C., and grade Hyflon® AD 80 contains an 80:20 ratio of dioxole to tetrafluoroethylene units, has a fractional free volume of 0.23, a density of 1.92 g/cm³ and a glass transition temperature of 134° C.

When in use in hydrocarbon-rich environments, the membranes frequently are capable of providing a selectivity for hydrogen over methane of about 20 or more, or even 50 or more or 100 or more, depending on the material chosen for the selective layer. For carbon dioxide over methane, the membranes can provide typical selectivities of 10, 15 or more, for carbon dioxide over ethylene about 10 or more. Such selectivities are remarkable, in that they can be achieved even in the presence of significant concentrations of $C_{3+}$ hydrocarbons and/or carbon dioxide, and at high feed pressure.

The thickness of the selective layer can be chosen according to the proposed use, but will generally be no thicker than 10 μm, and typically no thicker than 5 μm, and may be much thinner, such as 0.1 μm or less. The thickness of the coating layer is chosen taking into account the relative permeabilities of the selective material and the coating material for the target gases to be separated. The coating layer should be thick enough to adequately perform its protective role, yet not so thick that it represents a resistance to flow of the target gases that is comparable to or greater than the resistance to flow of the selective layer, so that the separation properties of the selective layer are wasted.

To be thick enough to provide protection against $C_{3+}$ hydrocarbons, the coating layer should preferably be of a great enough thickness to reduce the chemical potential or activity (vapor pressure) of the $C_{3+}$ hydrocarbons at the selective layer surface to no more than about 50% of its value in the bulk gas, and more preferably to no more than about 20% or most preferably 10% of its value in the bulk gas.

In general, with respect to the target gases—hydrogen, methane, ethane, carbon monoxide and so on—the coating layer material has a permeability at least about 5 times, and frequently 10 times, 20 times or more higher than the permeability of the selective material under similar conditions and in the absence of $C_{3+}$ hydrocarbons.

For example, in a carbon dioxide/methane separation process, a polyimide such as a 6FDA-MPDA (having a carbon dioxide/methane selectivity of about 50 as measured in $C_{3+}$ hydrocarbon-free gas mixtures) can optionally be used for the selective layer, and Hyflon® AD60 grade (having a carbon dioxide/methane selectivity of about 15 under similar conditions) can be used as the coating material.

The relative permeabilities of these two polymers are such that, if layers of roughly the same thickness were coated by themselves onto a microporous support, the Hyflon layer would provide a membrane pressure-normalized methane flux as much as 50 times higher than the polyimide layer and a carbon dioxide flux about 20 times higher than the polyimide layer. Thus it can be seen that the coating layer may be considerably thicker, and in some cases even an order of magnitude thicker, than the selective layer without compromising the overall transmembrane pressure-normalized flux and the carbon dioxide/methane separation performance.

Preferably the selective layer should be sufficiently thin that the membrane overall provide a pressure-normalized flux, as measured at 25° C., for pure hydrogen (or other faster permeating gas from a target pair), of at least about 50 GPU (where 1 GPU=$1\times10^{-6}$ cm$^3$(STP)/cm$^2$·s·cmHg), more preferably at least about 100 GPU and most preferably at least about 200 GPU.

Once formed, the membranes exhibit a combination of good mechanical properties, thermal stability, and high chemical resistance. The fluorocarbon polymers that form the coating layer are typically insoluble except in perfluorinated solvents and are resistant to acids, alkalis, oils, low-molecular-weight esters, ethers and ketones, aliphatic and aromatic hydrocarbons, and oxidizing agents, making them suitable for use not only in the presence of $C_{3+}$ hydrocarbons, but in many other hostile environments.

The membranes of the invention may be prepared in any known membrane form and housed in any convenient type of housing and separation unit. We prefer to prepare the membranes in flat-sheet form and to house them in spiral-wound modules. However, flat-sheet membranes may also be mounted in plate-and-frame modules or in any other way. If the membranes are prepared in the form of hollow fibers or tubes, they may be potted in cylindrical housings or otherwise.

The membrane separation unit, 2, comprises one or more membrane modules. The number of membrane modules required will vary according to the volume of gas to be treated, the composition of the feed gas, the desired compositions of the permeate and residue streams, the operating pressure of the system, and the available membrane area per module. Systems may contain as few as one membrane module or as many as several hundred or more. The modules may be housed individually in pressure vessels or multiple elements may be mounted together in a sealed housing of appropriate diameter and length.

The composition and pressure at which the feedstream, 1, is supplied to the membrane modules varies depending on the source of the stream. If the feed gas stream to be treated is at high pressure compared with atmospheric, such as 200 psia, 400 psia, 500 psia or above, the separation may optionally be effected simply by making use of this high pressure to provide an adequate driving force and feed:permeate pressure ratio. Otherwise, a pressure difference can be provided by compressing the feed stream, by drawing a vacuum on the permeate side of the membrane, or a combination of both. Polymer membranes can typically withstand pressure differences between the feed and permeate side up to about 1,500–2000 psi, so it might occasionally be necessary to let down the gas pressure before it can be fed to the membrane system.

As has already been discussed, an important consideration is the effect of hydrocarbons, particularly $C_{3+}$ hydrocarbons, in the feed stream. Unlike prior art membranes, the membranes of the invention can maintain useful gas/hydrocarbon separation performance, in terms of transmembrane gas flux and selectivity, when exposed to high concentrations of such organics, even when the gas mixture is close to saturation with these compounds. This is true with respect to a broad range of hydrocarbons, including paraffins, olefins, aromatics, such as benzene, toluene and xylenes (BTEX), alcohols and chlorinated compounds. These properties are different from those reported in the literature for dioxole membranes, as well as obtained with prior art conventional membrane materials, such as cellulose acetate, polysulfone, or polyimides that are not perfluorinated.

Even if condensation of organic liquid does accidentally occur from time to time, the membrane unit can generally be purged with, for example, an inert gas such as nitrogen, and the membranes will frequently continue thereafter to exhibit adequate gas/hydrocarbon selectivity properties.

In contrast, prior art membranes in commercial use are generally plasticized and irreversibly damaged by exposure to $C_{3+}$ hydrocarbon vapors at any significant concentration, such as more than about 10%, 20% or 25%, or at more modest concentrations, such as less than 10%, for prolonged periods, and cannot withstand even fleeting exposure to condensed organic liquids.

The ability of the membranes to withstand exposure to organic compounds means that the membrane modules may be cleaned with organic solvents. This is a very useful property. Industrial gas streams often contain small amounts of entrained oils and other relatively heavy organic components, which may enter the separation system and become trapped in the modules, fouling the membrane surface. Even if the membranes themselves are not damaged, the performance may be adversely affected by the build-up of such materials. One attractive feature of the present invention is that the modules can be cleaned periodically or as required by flushing with organic solvents to remove such contaminants.

As a rough general guide, the feed stream may often be acceptable at a total pressure that results in a partial pressure of $C_{3+}$ hydrocarbons of as high as 15 psia, 25 psia, 50 psia, 100 psia or more, assuming a gas temperature of ambient or above; and the residue stream partial pressure of the $C_{3+}$ hydrocarbons together can often be as high as 50 psia, 100 psia, 150 psia or 200 psia, again assuming a temperature of ambient or above. Expressed as the ratio of the feed pressure, P, to the saturation vapor pressure, $P_{sat}$, of the gas mixture, which is an approximate measure of the activity of the gas, the feed gas may be supplied to the membrane separation step at pressure and temperature conditions that result in the percentage $P/P_{sat}$ being at least about 25%, 30%, 50%, 60%, 70% or higher.

Similarly, feeds containing carbon dioxide may often be acceptable at pressures that result in partial pressures of carbon dioxide of 100 psia, 200 psia or more. Methane and $C_2$ components, which tend to have low boiling points, and to be less condensable and less harmful in terms of their plasticizing ability, can generally be present in any concentration.

Depending on the performance characteristics of the membrane, and the operating parameters of the system, the process can be designed for varying levels of gas purification and recovery. Single-stage gas-separation processes typically remove up to about 80–95% of the preferentially permeating component from the feed stream and produce a permeate stream significantly more concentrated in that component than the feed gas. This degree of separation is adequate for many applications.

If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the membrane separation step, 2, may be configured in many possible ways, including single-stage, multistage, multistep, or more complicated arrays of two or more units in series or cascade arrangements.

In light of their unusual and advantageous properties, the membranes and processes of the invention are useful for many separation applications in refineries, petrochemical plants, natural gas treatment facilities or the like.

The following list of hydrogen/methane applications of the invention in this aspect is exemplary, but not limiting: separation of hydrogen from methane and other light hydrocarbons in process and off-gas streams from: hydrocrackers; hydrotreaters of various kinds, including hydrodesulfurization units; coking reactors; catalytic reformers; catalytic crackers; specific isomerization, alkylation and dealkylation units; steam reformers; hydrogenation and dehydrogenation processes; and steam crackers for olefin production, as well as in streams from manufacture of primary petrochemicals, chemical intermediates, fuels, polymers, agricultural chemicals and the like.

Applications range from those treating very large streams, such as separation of hydrogen/light hydrocarbon mixtures in ethylene plant cold trains, to those handling much smaller streams, including recovery of hydrogen from vent streams generated by hydrogen reduction processes.

A particularly attractive use of the process is to recover hydrogen from streams containing less than about 40% hydrogen, and rich in $C_{3+}$ hydrocarbons, for which PSA or cryogenic condensation is not economically attractive. The process of the invention can be used to produce a hydrogen-rich permeate stream, 5, containing, for example, 90% hydrogen. A stream of such composition may be recompressed and used in other refinery unit operations, or subjected to further treatment to yield high purity hydrogen as required. The hydrocarbon-rich residue stream, 4, may be piped to the fuel header, thereby reducing the volume of fuel gas produced, or sent for LPG recovery, for example. In such a process, recovery of 50%, 60%, 70%, 80% or more of the hydrogen originally present in the waste stream is possible.

A second specific attractive application is hydrogen and olefin recovery from fluid catalytic cracking (FCC) off-gas. The FCC stream is the largest hydrogen-containing off-gas produced in a refinery. FCC off-gas streams are typically in the range 10 to 50 MMscfd and contain 10–20% hydrogen at 100–250 psig. The membrane process of the invention can be used to recover both hydrogen and hydrocarbons from these streams. The hydrogen product, 5, typically containing 80–90% hydrogen, can be used effectively in many applications, such as low-pressure hydrotreating. The hydrocarbon-rich residue, 4, can be used as fuel, or can be sent for olefin recovery from the hydrocarbon mixture by cryogenic distillation or the like.

A third specific application is the separation of hydrogen or carbon dioxide or both from ethylene steam cracker feed or product gases. Low molecular weight olefins, particularly ethylene and propylene, are typically made by cracking ethane, propane or heavier hydrocarbons with steam. The gas mixture leaving the cracker is a mixture of hydrogen, methane, hydrocarbons and carbon dioxide. After carbon dioxide has been removed, for example by absorption into an amine, potassium carbonate or sodium hydroxide solution, the mixture typically has a composition of about 20% hydrogen, 25–30% methane/ethane, 40–45% ethylene/propylene and 5–10% propane/butane. The process of the invention can be used to separate hydrogen from this mixture, either before or after the product olefins have been removed by cooling/condensation/fractionation. The process of the invention may also be used to remove carbon dioxide, and can supplement, or in some cases, replace, the amine or other scrubbing step.

A final exemplary set of applications is in the treatment of gases circulating in a reactor loop. Many operations carried out in refineries and petrochemical plants involve feeding a hydrocarbon/hydrogen stream to a reactor, withdrawing a reactor effluent stream of different hydrocarbon/hydrogen composition, phase separating the effluent into liquid and vapor portions, and recirculating part of the vapor stream to the reactor, so as to reuse unreacted hydrogen. Such loop operations are found, for example, in the hydrotreater, hydrocracker, and catalytic reformer sections of most modern refineries, as well as in isomerization reactors and hydrodealkylation units.

In addition to hydrogen, the overhead vapor from the phase separation usually contains light hydrocarbons, particularly methane and ethane. In a closed recycle loop, these components build up, change the reactor equilibrium conditions and can lead to catalyst degradation and reduced product yield. This build-up of undesirable contaminants is usually controlled by purging a part of the vapor stream from the loop. Such a purge operation is unselective however, and, since the purge stream may contain as much as 80 vol % or more hydrogen, multiple volumes of hydrogen can be lost from the loop for every volume of contaminant that is purged.

The process of the invention may be used to provide a selective purge capability. The overhead vapor from the phase separation step, or a portion thereof, is treated to provide a purified hydrogen permeate stream, 5, which may be recirculated in the reactor loop, and a hydrocarbon-rich, hydrogen-depleted residue stream, 4, which forms the purge stream. In this way purging can be carried out with reduced loss of hydrogen with the purged gas. Such reactor loops in which the invention can be used are found in hydrocracking, hydrotreating, catalytic reforming and hydrogenation, for example.

With regard to carbon dioxide/methane separation, it is envisaged that the process will be particularly useful as part of a natural gas processing train. Pipeline specification for natural gas is usually no more than about 2% carbon dioxide, but raw gas frequently contains more than 2% carbon dioxide and not infrequently contains 10% carbon dioxide or more. The process of the invention enables gas that is out of specification with respect to carbon dioxide to be brought to pipeline specification.

Furthermore, since the membranes used are able to withstand other contaminants in the gas, the carbon dioxide removal steps may be performed upstream of other gas treatments, if required. This provides greater flexibility in plant design and operation than is often possible using prior art carbon dioxide separation methods.

As one non-limiting example, the gas mixture may be raw natural gas containing methane, ethane, $C_{3-8}$ hydrocarbons, hydrogen sulfide, water vapor, and carbon dioxide. The goal of the process may then be to reduce the carbon dioxide content of the raw gas to 2% or below. The process can then provide a permeate enriched in the acid gases carbon dioxide and hydrogen sulfide and a product residue stream enriched in all hydrocarbons from which the methane may subsequently be separated and recovered to meet pipeline specification.

As a second non-limiting example, the feed gas stream may arise as a result of oil extraction by miscible flood operations. In these operations, carbon dioxide is injected into the ground at the periphery of an oil reservoir. The gas dissolves in the oil left in the pore space of the formation and lowers its viscosity. The resulting mixture is then pushed by water or gas pressure to the extraction wells. Initially the associated gas extracted with the oil is rich in methane, but over time the methane concentration falls and the carbon dioxide concentration rises, to as much as 80 or 90%. The mixture extracted from the wells is separated into recovered oil, produced water, carbon dioxide for reinjection, and condensed hydrocarbon liquids (NGL). Separation of the carbon dioxide from the methane and other hydrocarbons in the associated gas is important for the process to be economically sound.

In this case, the raw gas stream may contain large amounts of carbon dioxide, a mix of relatively heavy $C_{3+}$ hydrocarbons and relatively small amounts of methane. The process can provide a permeate comprising mostly carbon dioxide of a quality suitable for reinjection, and a residue stream of mixed hydrocarbons, to be used as fuel gas or subjected to additional processing, such as cooling and phase separation, for example, for recovery of NGL and/or pipeline grade gas.

As a third non-limiting example, the feed stream may be a gas stream from a petrochemical manufacturing process, comprising a petrochemical feedstock, such as ethylene, as well as carbon dioxide and inert gases. As mentioned above, such gas may be treated to remove carbon dioxide as a carbon dioxide rich permeate waste stream as part of an operation to recover ethylene for recirculation within the process for additional ethylene conversion.

Optionally, the processes of the invention already discussed may include other separation steps used in conjunction with the defined membrane separation process. Examples of such separation steps include adsorption, absorption, condensation, and distillation. The other separation steps may be carried out upstream, downstream or both of the membrane separation step, that is, with reference to FIG. 1 on any of streams 1, 4 and 5. As non-limiting examples, streams may be filtered to separate out entrained oil or water droplets, passed through a glycol absorption unit for dehydration, subjected to amine scrubbing to remove hydrogen sulfide or carbon dioxide, or cooled to condense out high boiling components.

In particular, processes that include the membrane separation step combined with a pressure swing adsorption (PSA) step are useful. Details of the operation of PSA units are well documented in the art, as are combinations of membrane separation and PSA. Further details of applications for and operation of such hybrid processes may be found in U.S. Pat. Nos. 6,011,192 and 6,350,371, for example.

In another aspect, the invention is a gas-separation membrane.

Figure 2:
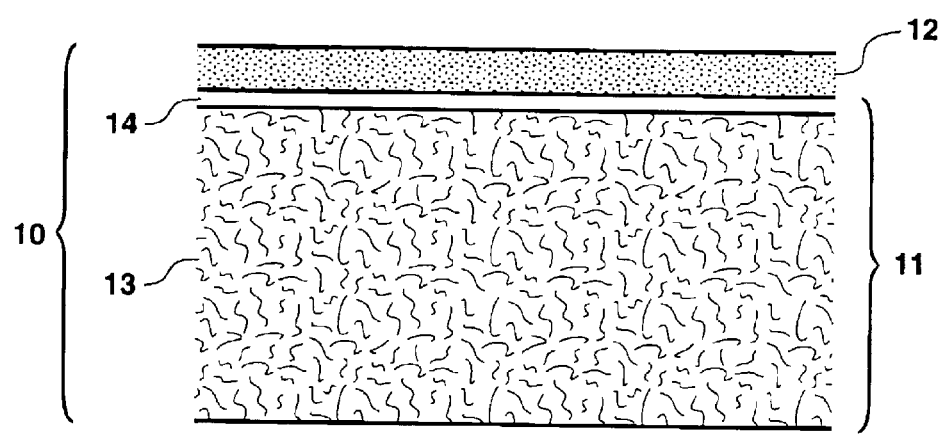
FIG. 2 is a schematic drawing of a basic embodiment of a membrane having a selective layer and a coating layer.

The membrane, 10, is shown schematically in a basic embodiment in FIG. 2, and comprises a base membrane, 11, which has the ability to separate a pair of target gases, such as hydrogen and methane, or carbon dioxide and ethylene, and a $C_{3+}$ hydrocarbon-resistant coating, 12. The base membrane includes a selective layer, 14, that is principally responsible for the selective properties of the membrane with respect to the target gas pair and a support structure, 13.

The selective layer may be the skin layer of an integral asymmetric membrane, or may be a layer of different chemical struettire deposited or formed on an underlying support membrane.

The base membrane, 11 includes a support layer, 13, and a selective layer, 14. The requirements and preferences for the base membrane, including type, construction method and materials are as described above with respect to the process embodiments of the invention.

In brief, the base membrane may be an integral asymmetric membrane or a composite membrane of any type. Suitable materials for integral asymmetric membranes include polysulfone, cellulose acetate, polyamide, polyaramid, polyimide, polyetherimide, polyester, polycarbonate, polyvinylidene fluoride, polypropylene, polyethylene and polytetrafluoroethylene. Such glassy materials may also be used in microporous form as the support membrane for a composite membrane, and in dense, nonporous form as the selective layer of a composite membrane.

Although preparation of an integral asymmetric membrane by phase inversion and preparation of a composite membrane by solution coating a support are the most commonly used methods, other techniques for forming the selective layer are possible within the scope of the invention.

As one example, a highly selective skin or layer may also be formed by modifying the surface of an asymmetric membrane, such as by fluorination or other known surface-modification technique, to provide a higher selectivity but lower flux surface region. As another, a layer of a polymer precursor may be deposited on the support structure and the selective layer completed by cross linking by heating, irradiation, plasma polymerization or other method. As yet another example, an interfacial composite membrane may be made by sequentially depositing two reagents in solution and allowing them to react at the solution interfaces.

Thus the invention does not limit the manner in which a structure having a relatively porous supporting substrate, 13, and a gas-tight selective layer, 14 is arrived at.

The selective layer should preferably be thin, that is, generally be no thicker than 10 $\mu$m, and typically no thicker than 5 $\mu$m, and may be much thinner, such as 0.1 $\mu$m or less.

The base membrane has a different performance depending on the presence or absence of $C_{3+}$ hydrocarbon vapors in the gas mixture.

If exposed to a gas mixture that is essentially free of $C_{3+}$ hydrocarbons, the base membrane exhibits a first hydrogen/methane selectivity and a first pressure-normalized hydrogen flux for the faster permeating of the gases to be separated.

If exposed to a gas mixture that contains $C_{3+}$ hydrocarbons, the base membrane exhibits a second, and lower, hydrogen/methane selectivity and a second, and higher, pressure-normalized hydrogen flux.

The $C_{3+}$ hydrocarbon-resistant coating layer, 12, serves to protect the base membrane from exposure to $C_{3+}$ hydrocarbon vapors. It is not sufficient, therefore, that the coating be an occluding coating of the type first disclosed in U.S. Pat. No. 4,230,463, which enters and plugs surface defects. Rather, the coating layer should form an essentially unbroken coating over the entirety of the base membrane surface on the feed side.

The coating layer material is chosen, in addition to its ability to reject $C_{3+}$ hydrocarbons, taking into account both its intrinsic selectivity and permeability compared to the selective layer material.

In general, the coating layer is made from a polymer having an intrinsically lower selectivity than the selective layer polymer for hydrogen/methane. Thus, the coating layer is not relied upon to contribute its selective properties to the selectivity of the membrane, and does not necessarily or usually result in a higher selectivity for the target gas pair to be separated for the coated membrane compared to the first selectivity of the base membrane.

However, since the base membrane is now protected from plasticization by hydrocarbons, the coated membrane exhibits a hydrogen/methane selectivity in the presence of $C_{3+}$ hydrocarbons that is higher than the second selectivity (that is, the hydrogen/methane selectivity displayed by the base membrane under $C_{3+}$ hydrocarbon exposure conditions).

In other words, the membrane is characterized by three selectivities:

| | |
|---|---|
| $\alpha_{first}$ | Base membrane selectivity for hydrogen over methane in absence of $C_{3+}$ hydrocarbons |
| $\alpha_{second}$ | Base membrane selectivity for hydrogen over methane in presence of $C_{3+}$ hydrocarbons |
| $\alpha_{membrane}$ | Membrane selectivity for hydrogen over methane in presence of $C_{3+}$ hydrocarbons, | and these selectivities typically satisfy the relationship:

$$\alpha_{first} \geq \alpha_{membrane} > \alpha_{second}.$$

The coating layer forms an essentially unbroken coat over the feed side surface of the base membrane. Thus, this layer contributes to the overall resistance of the membrane to gas transport, and will result in a reduction in pressure-normalized flux of the finished membrane compared to the base membrane. As defined above, if a gas mixture is essentially free of $C_{3+}$ hydrocarbons, the base membrane exhibits a first pressure-normalized hydrogen flux; if $C_{3+}$ hydrocarbons are present, but conditions are otherwise unchanged, the base membrane exhibits a second, higher pressure-normalized hydrogen flux, because of the plasticizing effects of the hydrocarbons.

Thus, three pressure-normalized fluxes may be defined for comparison:

| | |
|---|---|
| $(P/l)_{first}$ | Base membrane pressure-normalized hydrogen flux in absence of $C_{3+}$ hydrocarbons |
| $(P/l)_{second}$ | Base membrane pressure-normalized hydrogen flux in presence of $C_{3+}$ hydrocarbons |
| $(P/l)_{membrane}$ | Coated (thicker) membrane pressure-normalized hydrogen flux in presence of $C_{3+}$ hydrocarbons, | and:

$$(P/l)_{second} > (P/l)_{first}.$$

The membrane including the coating layer is resistant to plasticization. Therefore, the coated membrane does, and should, exhibit a substantially lower pressure-normalized hydrogen flux than is exhibited by the base membrane when suffering from $C_{3+}$ hydrocarbon plasticization. That is:

$$(P/l)_{membrane} < (P/l)_{second}.$$

However, it is clearly desirable that the coating should not seriously compromise the flux capability of the unplasticized membrane. Expressed as a quantitative preference:

$$(P/l)_{membrane} > n/100 \times (P/l)_{first},$$

where n is at least 50, preferably at least 70, and more preferably at least 80.

Also, as discussed above with respect to the process embodiments, the membrane should preferably be capable of providing a pressure-normalized flux of the faster permeating of the commonly found target gases to be separated of at least about 50 GPU.

These preferences require both that the coating material should be of intrinsically higher permeability than the material used for the selective layer, and that the coating layer should not be overly thick, yet thick enough to be unbroken and to provide adequate protection. These requirements, and, in an exemplary way, how they are met by using a polyimide selective layer and a Hyflon coating layer for a membrane used for carbon dioxide separation, have already been discussed above with respect to the description of FIG. 2, and are incorporated again here.

In general, the coating layer should be capable of reducing the activity or partial pressure of $C_{3+}$ hydrocarbons to which the selective layer is exposed to about 50%, 20% or even 10% or less of the activity or partial pressure at the coating layer surface. In general, a coating layer thinner than 50 $\mu$m, and more preferably no thicker than about 5 $\mu$m, 10 $\mu$m or 20 $\mu$m is able to accomplish this.

The coated membranes differ from membranes previously available in the art in that:
(i) the membranes are able to maintain their separation properties for hydrogen/methane, carbon dioxide/methane and other gas pairs in the presence of $C_{3+}$ hydrocarbon vapor, even at high levels in a gas mixture, and
(ii) the membranes can recover from accidental exposure to liquid organic compounds.

To provide these attributes, coating layer 12 is made from a glassy polymer or copolymer, and both the coating layer and the polymers of which it is made have the same required and desired attributes as presented above with respect to the process embodiments. In brief, the coating layer polymer has a fractional free volume no greater than about 0.3 and a glass transition temperature of at least about 100° C., and is chosen from the group consisting of (I) polymers comprising repeating units having a fluorinated cyclic structure of an at least four-member, more preferably at least five-member, ring, and (II) polymers having a ratio of fluorine to carbon atoms in the polymer greater than 1:1. Particularly preferred materials for the coating layer are copolymers of a fluorinated dioxole with tetrafluoroethylene.

In addition to the layers shown in FIG. 2, the membranes may optionally include other layers as already discussed with respect to the process embodiments, such as sealing layers, gutter layers and additional selective layers.

The membrane may take any form, such as hollow fibers or flat sheets, and may be packaged into any kind of module or housing.

In a basic embodiment, the membranes of the invention include the following elements:
(a) a base membrane having a feed side and a permeate side, and comprising a polymeric selective layer on the feed side, wherein the base membrane exhibits:
(i) a first selectivity for a first gas over a second gas under a set of operating conditions and in the absence of $C_{3+}$ hydrocarbons, and
(ii) a second selectivity for the first gas over the second gas under the same set of operating conditions as in (i) but in the presence of $C_{3+}$ hydrocarbons, wherein the second selectivity is lower than the first selectivity; and
(iii) a first pressure-normalized flux for the first gas under the set of operating conditions and in the absence of $C_{3+}$ hydrocarbons;

(b) a $C_{3+}$ hydrocarbon-resistant polymeric coating layer coating the base membrane on the feed side, wherein the polymeric coating layer comprises a polymer chosen from the group consisting of (i) polymers comprising repeating units having a fluorinated cyclic structure of an at least 4-member ring, the polymers having a fractional free volume no greater than about 0.3, and (ii) polymers having (A) a ratio of fluorine to carbon atoms in the polymer greater than 1:1;
(B) a fractional free volume no greater than about 0.3; and
(C) a glass transition temperature of at least about 100° C.;
and wherein the gas separation membrane exhibits:
(i) a third selectivity for the first gas over the second gas under the same set of operating conditions and in the presence of $C_{3+}$ hydrocarbons that is higher than the second selectivity and at least about the first selectivity, and
(ii) a second pressure-normalized flux for the first gas under the same set of operating conditions and in the presence of $C_{3+}$ hydrocarbons that is at least about 70% of the first pressure-normalized flux.

Additional details regarding application areas, process operating conditions and environments and the like may be found in co-owned U.S. Pat. Nos. 6,361,582; 6,361,583; 6,579,341; 6,544,316 and 6,572,680, all of which are incorporated herein by reference in their entirety.

The invention is now illustrated in further detail by specific examples. These examples are intended to further clarify the invention, and are not intended to limit the scope in any way.

EXAMPLES

Example 1

Membrane Making and Testing

Asymmetric, microporous poly(vinylidene fluoride) [PVDF] support membranes were prepared. Composite membranes were prepared using the following coating solutions:

1 wt % copolymer solution of 40% tetrafluoroethylene/ 60% 2,2,4-trifluoro-5-trifluorometoxy-1,3-dioxole (Hyflon® AD60), (Solvay Solexis, Thorofare, N.J.), in a perfluorinated solvent (Fluorinert FC-84), (3M, St. Paul, Minn.).

1 wt % copolymer solution of 20% tetrafluoroethylene/ 80% 2,2,4-trifluoro-5-trifluorometoxy-1,3-dioxole (Hyflon® AD80), (Solvay Solexis, Thorofare, N.J.), in FC-84 solvent.

1 wt % polyperfluoro (alkenyl vinyl ether) (Cytop®), (Asahi Glass, Japan), in FC-84 solvent.

The support membranes were dip-coated in a solution of one of the three selective polymer solutions at 1 ft/min coating speed, then dried in an oven at 60° C. for 10 minutes. The resulting membranes had a selective layer thickness ranging from 0.2–0.5 μm.

Samples of each finished composite membrane were cut into 12.6 cm² stamps and tested in a permeation test-cell apparatus with pure gases at 35° C. feed temperature and 65 psia feed pressure. During each test, the feed, permeate, and residue compositions were analyzed by gas chromatography (GC).

The gas fluxes of the membranes were measured, and the selectivities were calculated. Table 1 summarizes the fluxes and Table 2 summarizes the selectivities of the composite membranes, calculated as the ratio of the pure gas fluxes.

TABLE 1

| | Pure-Gas Pressure-Normalized Flux (GPU) | | |
|---|---|---|---|
| Gas | Hyflon ® AD60 | Hyflon ® AD80 | Cytop ® |
| Nitrogen | 52 | 184 | 34 |
| Oxygen | 180 | 574 | 130 |
| Helium | 1,360 | 1,850 | 1,270 |
| Hydrogen | 790 | 2,040 | 620 |
| Argon | 85.4 | 289 | 56 |
| Carbon Dioxide | 433 | — | 300 |
| Methane | 17.6 | 65.8 | 11 |
| Ethane | 4.5 | 18.8 | 3 |
| Ethylene | 9.8 | 35.9 | 5.7 |
| Propane | 1.1 | — | 3.4 |
| Propylene | 5.1 | 25.6 | — |
| $CF_4$ | 0.94 | 3.38 | 0.48 |
| $NF_3$ | 10.3 | 38.8 | 5.7 |

1 GPU = 1 × 10⁻⁶ cm³(STP)/cm² · s · cmHg

TABLE 2

| | Selectivity (−) | | |
|---|---|---|---|
| Gas Pair | Hyflon ® AD60 | Hyflon ® AD80 | Cytop ® |
| $N_2/CF_4$ | 55 | 58 | 71 |
| $O_2/N_2$ | 3.5 | 3.1 | 3.8 |
| $N_2/CH_4$ | 2.9 | 2.8 | 3.2 |
| $He/H_2$ | 1.7 | 0.91 | 2.0 |
| $Ar/CH_4$ | 4.8 | 4.4 | 5.3 |
| $Ar/C_2H_4$ | 8.7 | 8.0 | 9.7 |
| $CO_2/CH_4$ | 26 | — | 28 |
| $H_2/CH_4$ | 45 | 31 | 59 |
| $N_2/C_2H_4$ | 5.3 | 5.1 | 6.0 |
| $N_2/C_2H_6$ | 10 | 7.2 | — |

Example 2

Solvent Resistance of Hyflon® AD60 Compared to Polysulfone

Experiments were carried out to determine the stability of a Hyflon® AD60 membrane in the presence of hydrocarbon solvents. Samples of a Hyflon® AD60 membrane were tested in a permeation test-cell as in Example 1. The fluxes were measured and the selectivities calculated.

The membrane stamps were then immersed in liquid toluene or hexane. After one week, the membranes were removed from the hydrocarbon liquid, dried at ambient temperature, and retested in the gas permeation test-cell. A polysulfone (PSF) asymmetric membrane, typically used in hydrogen separation processes, was also tested for comparison. The permeation properties of the Hyflon® AD60 and polysulfone membranes before and after exposure to the hydrocarbon solvent are summarized in Table 3.

TABLE 3

| Membrane | Initial Flux (GPU) | | Initial Selectivity (–) | | Post-Toluene Flux (GPU) | | Post-Toluene Selectivity (–) | |
|---|---|---|---|---|---|---|---|---|
| | $N_2$ | $H_2$ | $O_2/N_2$ | $H_2/CH_4$ | $N_2$ | $H_2$ | $O_2/N_2$ | $H_2/CH_4$ |
| Hyflon® | 30 | 350 | 3.1 | 25 | 41 | 477 | 3.1 | 26 |
| PSF | 1.2 | — | 5.6 | — | | Dissolved | | |

| Membrane | Initial Flux (GPU) | | Initial Selectivity (–) | | Post-Hexane Flux (GPU) | | Post-Hexane Selectivity (–) | |
|---|---|---|---|---|---|---|---|---|
| | $N_2$ | $H_2$ | $O_2/N_2$ | $H_2/CH_4$ | $N_2$ | $H_2$ | $O_2/N_2$ | $H_2/CH_4$ |
| Hyflon® | 31 | 350 | 3.0 | 24 | 41 | 480 | 3.1 | 27 |
| PSF | 0.6 | 50 | 6.8 | 99 | 1.6 | 87 | 5.9 | 48 |

As can be seen, the polysulfone membranes could not withstand exposure to toluene, and their hydrogen/methane selectivity declined by half after exposure to hexane. In contrast, the dioxole copolymer Hyflon® membranes, although they exhibited higher fluxes for all gases for which they were tested after soaking in liquid hydrocarbons, retained their hydrogen/methane selectivity.

Example 3

Membrane Making and Testing with Teflon® AF 2400 Composite Membranes—Not in Accordance with the Invention Asymmetric, microporous poly(vinylidene fluoride) [PVDF] support membranes were prepared. Composite membranes were prepared by dip-coating the support membranes three times in a solution of 1 wt % 2,2-bistrifluoromethyl-4,5-difluoro-1,3-dioxole/tetrafluoroethylene copolymer [Teflon® AF2400] solution in FC-84 solvent at 1 ft/min coating speed, then dried in an oven at 60° C. for 10 minutes. The resulting membranes had a selective layer thickness of 4 μm.

Samples of each finished composite membrane were cut into 12.6 cm² stamps and tested in a permeation test-cell apparatus with pure oxygen and nitrogen at 22° C. feed temperature and 65 psia feed pressure. During each test, the feed, permeate, and residue compositions were analyzed by gas chromatography (GC).

The gas fluxes were measured, and the selectivities were calculated. Table 4 summarizes the pressure-normalized fluxes and selectivities of the composite Teflon® AF membranes.

TABLE 4

| Mixed-Gas Pressure-Normalized Flux (GPU) | | Selectivity (–) |
|---|---|---|
| $N_2$ | $O_2$ | $O_2/N_2$ |
| 185 | 353 | 1.9 |

Examples 4–6

Comparison of Pure-Gas Permeation Properties with Hyflon® AD and Teflon® AF2400 Membranes Example 4

Hyflon® AD60 Pure-Gas Permeation Properties

Hyflon® AD60 membranes were prepared as in Example 1, except using a poly(etherimide) support layer. The resulting membranes were tested as in Example 1 with pure hydrogen, nitrogen, methane, ethane, propane, and n-butane at 35° C. at feed pressures ranging from 35 to 165 psia. The n-butane was tested only at 32 psia, which is nearly 70% of the saturation vapor pressure of n-butane at 35° C. The measured pressure-normalized gas fluxes are shown graphically in FIG. 3. The calculated hydrogen/hydrocarbon selectivities are shown in FIG. 4.

Figure 3:
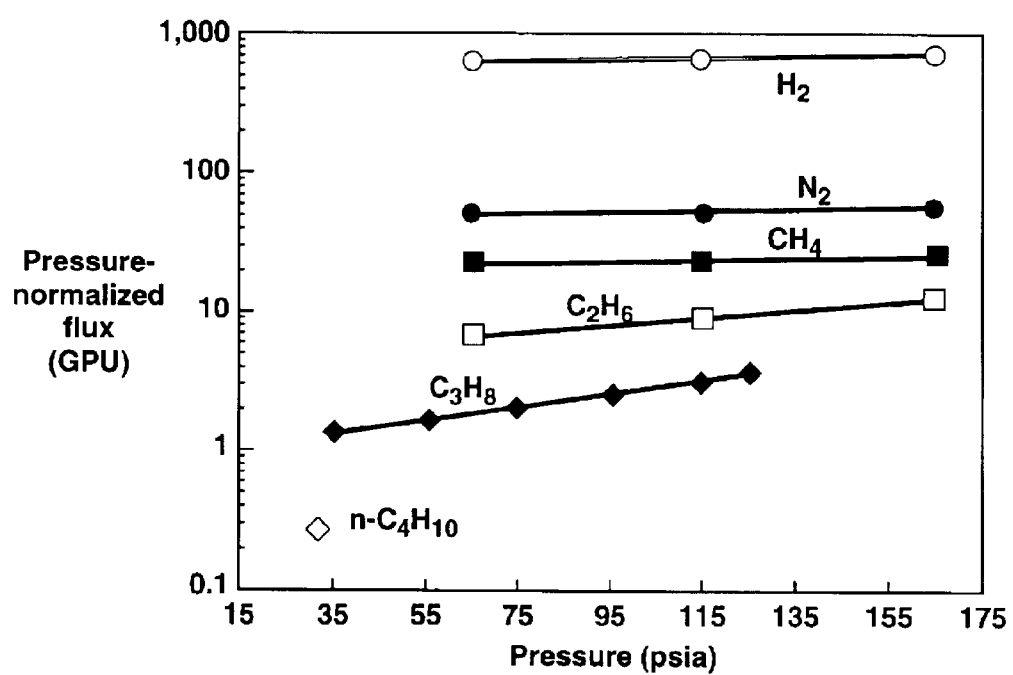
FIG. 3 is a graph of pressure-normalized pure-gas flux of hydrogen, nitrogen and several light hydrocarbons as a function of pressure for composite membranes having Hyflon® AD60 selective layers.

As can be seen in FIG. 3, the hydrogen, nitrogen, and methane fluxes remained nearly constant across the range of pressures. The ethane flux increased from 6.9 GPU at 65 psia to 12.6 GPU at 165 psia, and the propane flux increased from 1.4 GPU at 35 psia to 3.9 GPU at 125 psia, which is about 70% of the saturation vapor pressure (180 psia) of propane at 35° C.

Figure 4:
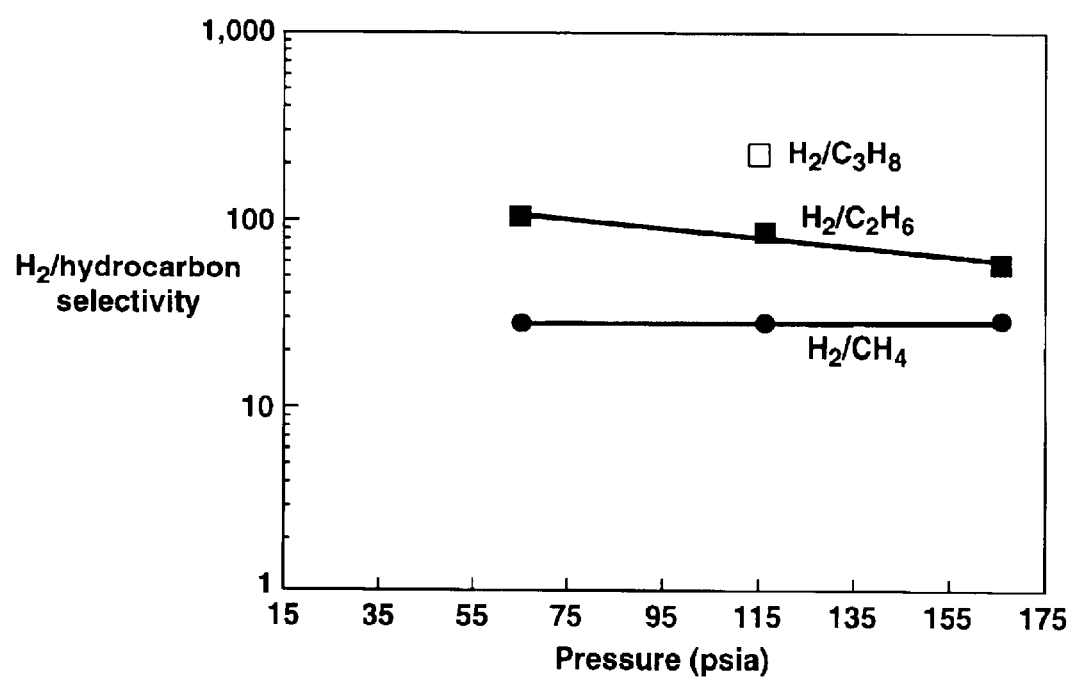
FIG. 4 is a graph of calculated hydrogen/hydrocarbon selectivity based on the pure gas data of FIG. 3.

As shown in FIG. 4, the hydrogen/methane selectivity remained constant at approximately 29 across the range of pressures. The hydrogen/ethane selectivity decreased slightly from 97 at 65 psia to 83 at 115 psia, then decreased further to 57 at 165 psia. The hydrogen/propane selectivity was 230 at 115 psia.

Example 5

Hyflon® AD80 Pure-Gas Permeation Properties

Hyflon® AD80 membranes were prepared as in Example 1, except using a poly(etherimide) support layer. The resulting membranes were tested as in Example 1 with pure hydrogen, nitrogen, methane, ethane, propane, and n-butane at 35° C. at feed pressures ranging from 35 to 165 psia. The n-butane was tested only at 32 psia, which is nearly 70% of the saturation vapor pressure of n-butane at 35° C. The measured pressure-normalized gas fluxes are shown graphically in FIG. 5. The calculated hydrogen/hydrocarbon selectivities are shown graphically in FIG. 6.

Figure 5:
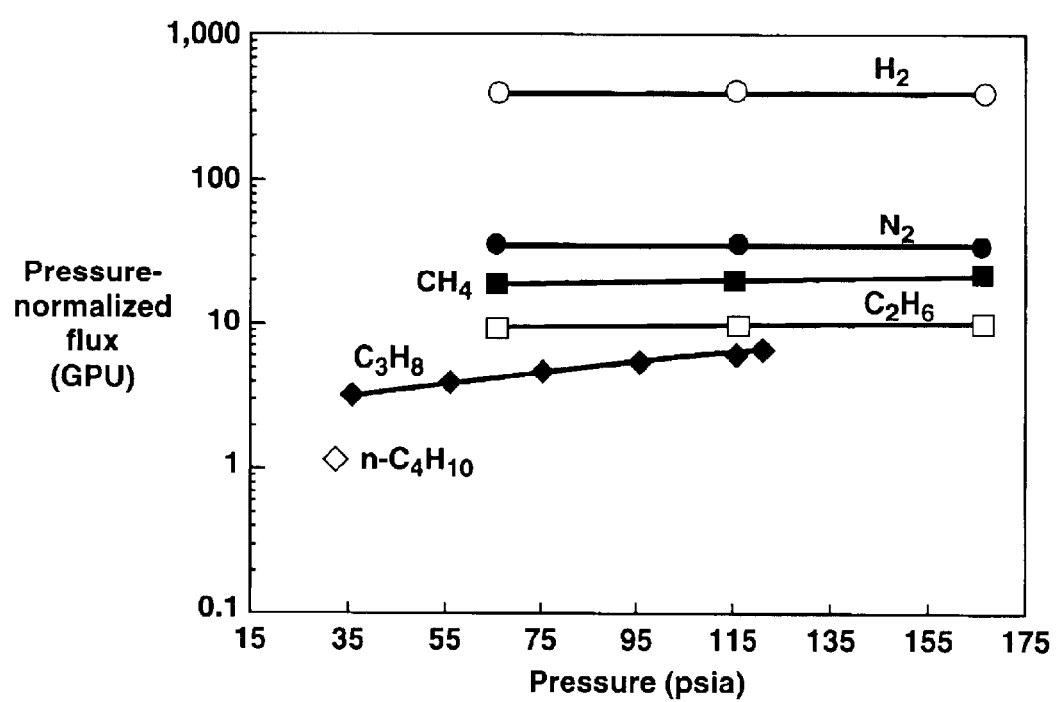
FIG. 5 is a graph of pressure-normalized pure-gas flux of hydrogen, nitrogen and several light hydrocarbons as a function of pressure for composite membranes having Hyflon® AD80 selective layers.
Figure 6:
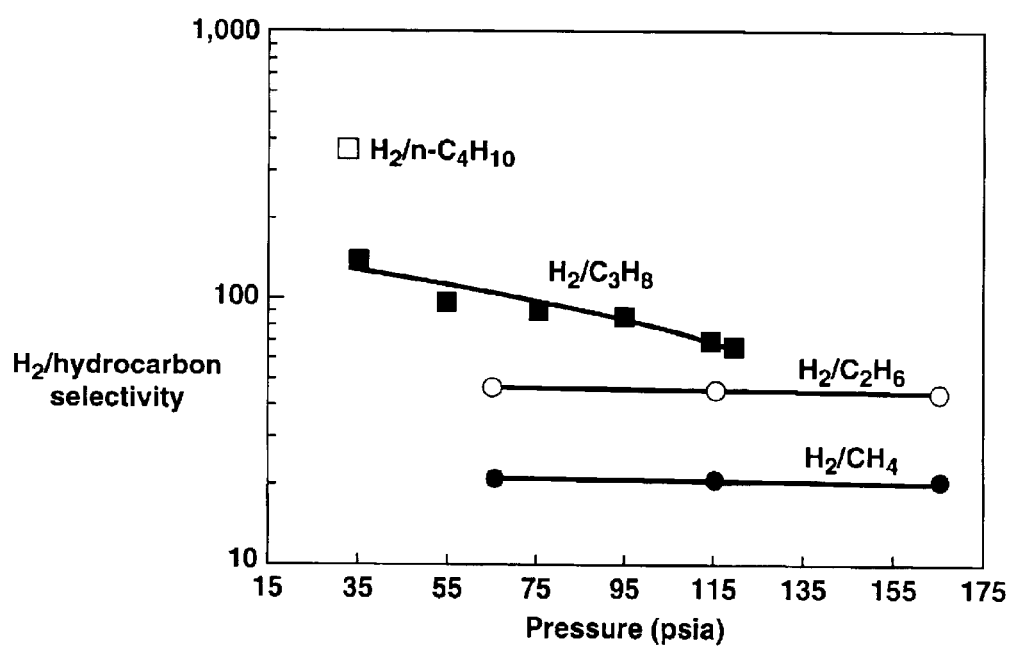
FIG. 6 is a graph of calculated hydrogen/hydrocarbon selectivity based on the pure gas data of FIG. 5.

As can be seen in FIG. 5, the hydrogen, nitrogen, methane and ethane fluxes remained nearly constant across the range of pressures. The propane flux increased from 3 GPU at 35 psia to 6.6 GPU at 120 psia. As shown in FIG. 6, the hydrogen/methane and hydrogen/ethane selectivities remained constant at approximately 20 and 44, respectively, across the range of pressures. The hydrogen/propane selectivity decreased from 140 at 35 psia to 66 at 120 psia. Thus, as in the previous example, the membranes retained useful hydrogen/hydrocarbon selectivity, even at close to hydrocarbon saturation. The hydrogen/n-butane selectivity was 373.

Example 6

Teflon® AF2400 Pure-Gas Permeation Properties— Not in Accordance with the Invention Teflon® AF2400 membranes were prepared as in Example 3, except using a poly(etherimide) support layer. The resulting membranes were tested as in Example 3 with pure hydrogen, nitrogen, methane, ethane, propane, and n-butane at 35° C. at pressures ranging from 17 to 165 psia. The n-butane was tested only up to 31 psia, 31 psia being about 65% of the saturation vapor pressure of n-butane at 35° C. The measured pressure-normalized gas fluxes are shown graphically in FIG. 7. The calculated hydrogen/hydrocarbon selectivities are shown graphically in FIG. 8.

Figure 7:
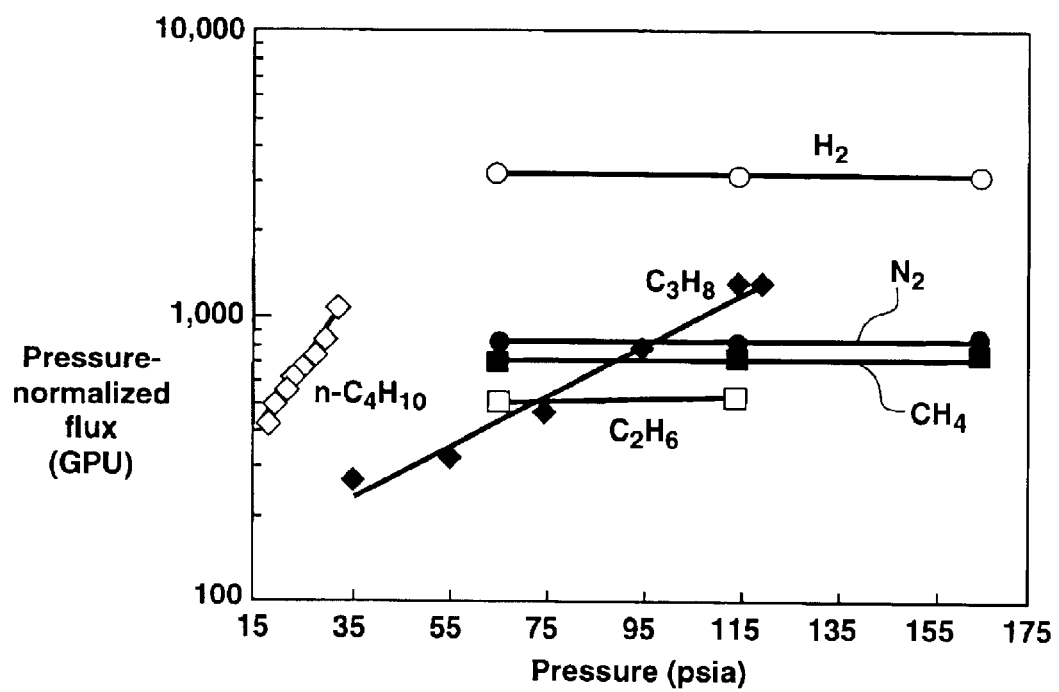
FIG. 7 is a graph of pressure-normalized pure-gas flux of hydrogen, nitrogen and several light hydrocarbons as a function of pressure for composite membranes having Teflon® AF 2400 selective layers.

As can be seen in FIG. 7, the hydrogen, nitrogen, methane, and ethane fluxes remained nearly constant across the range of pressures. The propane flux increased nearly five-fold from 268 GPU at 35 psia to 1,310 GPU at 120 psia, and the n-butane flux increased from 400 GPU at 17 psia to 1,110 GPU at 31 psia.

Figure 8:
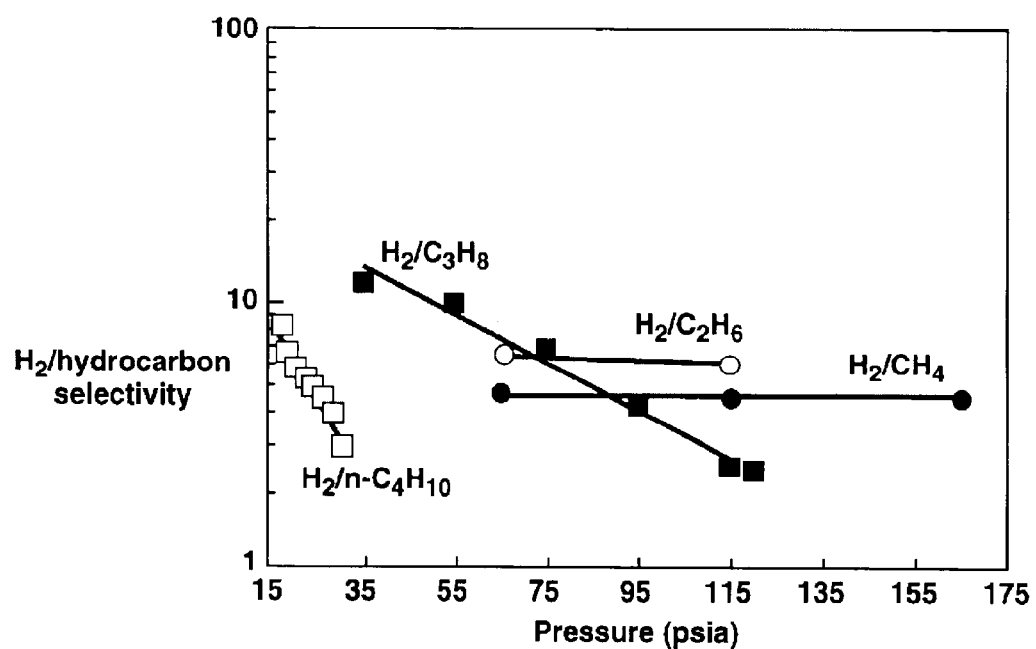
FIG. 8 is a graph of calculated hydrogen/hydrocarbon selectivity based on the pure gas data of FIG. 7.

As shown in FIG. 8, the hydrogen/methane selectivity remained constant at approximately 4.4 across the range of pressures. The hydrogen/ethane selectivity decreased slightly from 6.4 at 65 psia to 5.9 at 115 psia. The hydrogen/propane selectivity decreased from 10.6 at 35 psia to 2.4 at 120 psia, indicating that the Teflon® AF was being plasticized by the propane. The selectivity declined to about 5, less than half its original value, at a pressure of about 75 psia, which is only about 40% of the 180 psia saturation vapor pressure of propane at 35° C. Likewise, the hydrogen/n-butane selectivity decreased from 7.8 at 17 psia to 2.8 at 31 psia, again indicating that the material had plasticized and lost its hydrogen-selective capability in the presence of $C_{3+}$ hydrocarbons.

Examples 7–8

Hyflon® AD60 Multicomponent Mixed-Gas Permeation Properties as a Function of Pressure

Example 7

Hyflon® AD60 membranes were prepared as in Example 4 above and were tested with a gas mixture containing approximately 42% hydrogen, 20% methane, 25% ethane, 11% propane, and 1.4% n-butane at 25° C. at feed pressures ranging from 115 to 415 psia. The saturation vapor pressure of the gas mixture was about 1,130 psia; thus, at 415 psia, the mixture was about 37% saturated.

Figure 9:
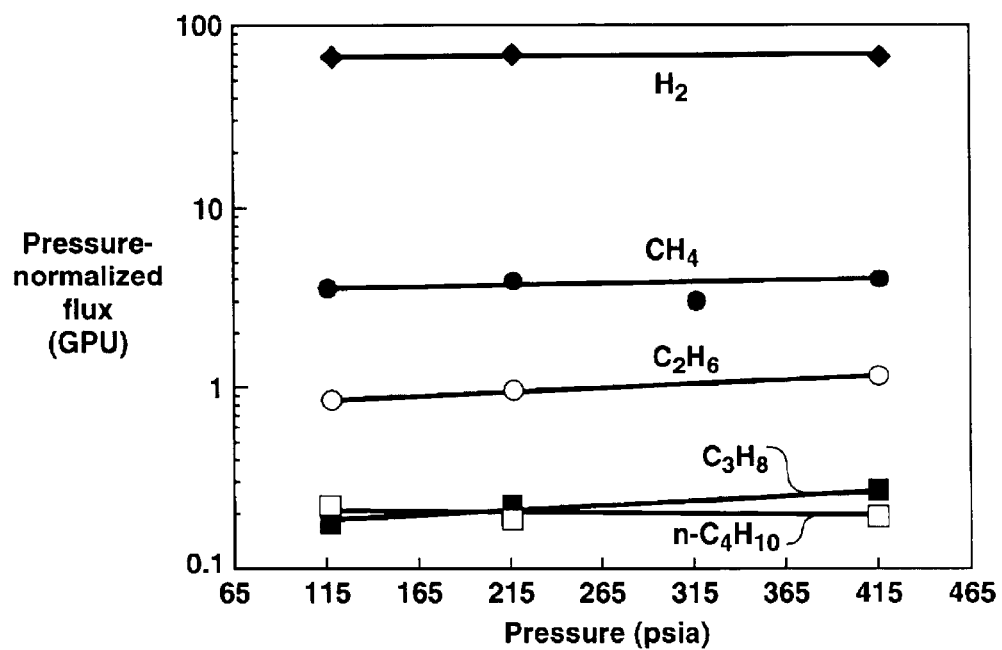
FIG. 9 is a graph of pressure-normalized mixed-gas flux of hydrogen and several light hydrocarbons as a function of pressure for composite membranes having Hyflon® AD 60 selective layers.

The measured pressure-normalized gas fluxes are shown graphically in FIG. 9. The calculated hydrogen/hydrocarbon selectivities are shown graphically in FIG. 10.

Figure 10:
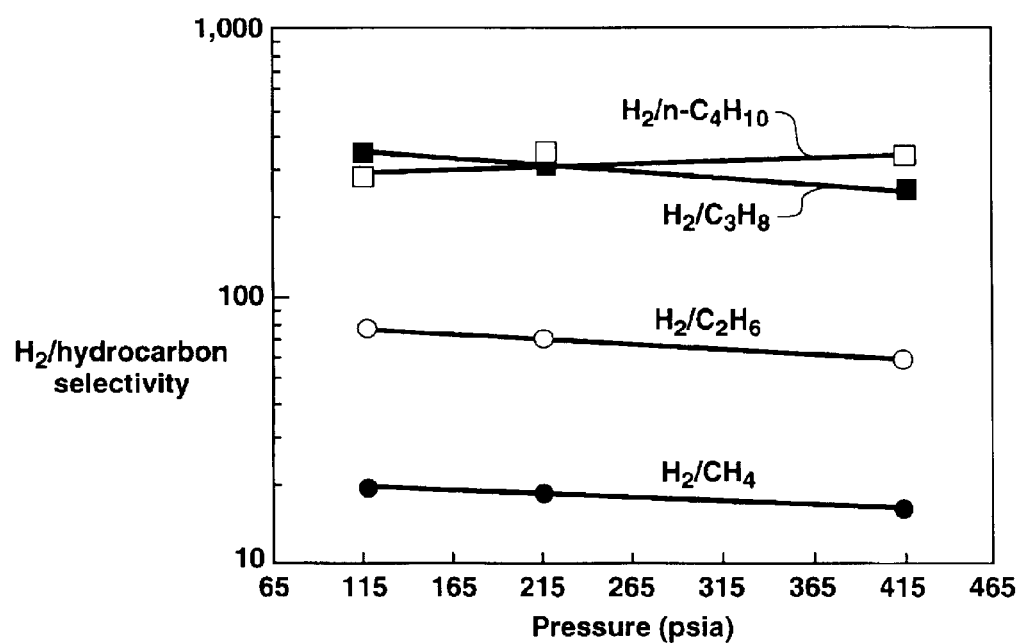
FIG. 10 is a graph of mixed-gas hydrogen/hydrocarbon selectivities based on the mixed gas data of FIG. 9.

As can be seen in FIG. 9, the fluxes of hydrogen, methane, ethane, and propane increased slightly across the range of pressures. The n-butane flux decreased slightly from 0.23 GPU at 115 psia to 0.20 GPU at 415 psia. As shown in FIG. 10, the hydrogen/methane, hydrogen/ethane, and hydrogen/propane selectivities decreased slightly across the range of pressures. The hydrogen/n-butane selectivity appeared to increase from 280 to 328 as the feed pressure increased, but this apparent increase is within the range of experimental error.

Example 8

Hyflong®AD60 membranes were prepared as in Example 4 above and were tested with a gas mixture containing approximately 63% carbon dioxide, 27% methane, and 10% propane at 22 C. at feed pressures ranging from 115 to 415 psia. The saturation vapor pressure of the gas mixture is about 915 psia; thus, at 415 psia, the mixture was about 45% saturated. The measured pressure-normalized gas fluxes are shown graphically in FIG. 11. The calculated carbon dioxide/hydrocarbon selectivities are shown graphically in FIG. 12.

Figure 11:
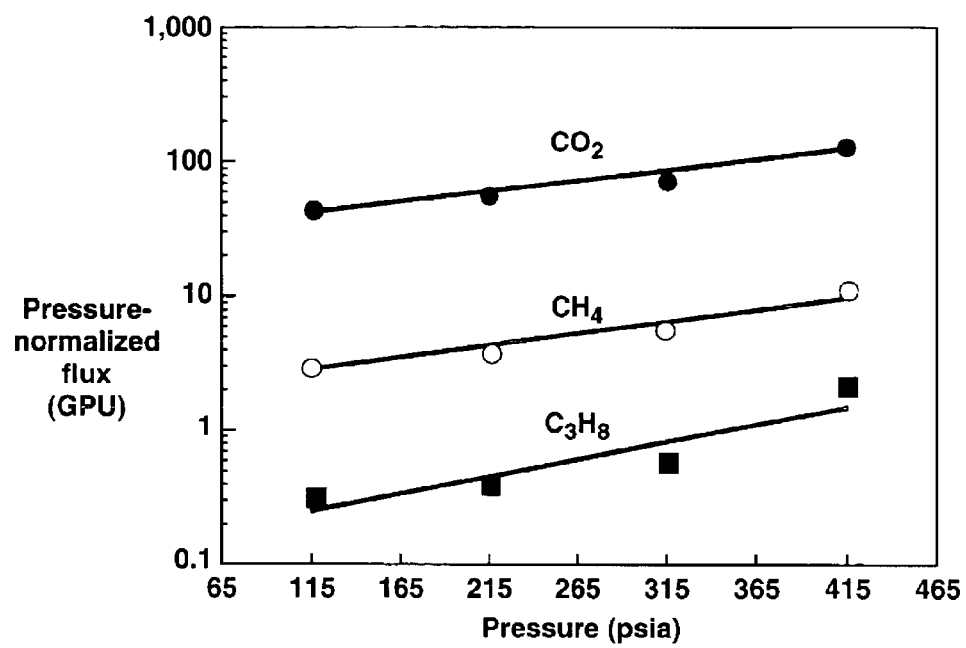
FIG. 11 is a graph of pressure-normalized mixed-gas flux of carbon dioxide, methane and propane as a function of pressure for composite membranes having Hyflon® AD 60 selective layers.
Figure 12:
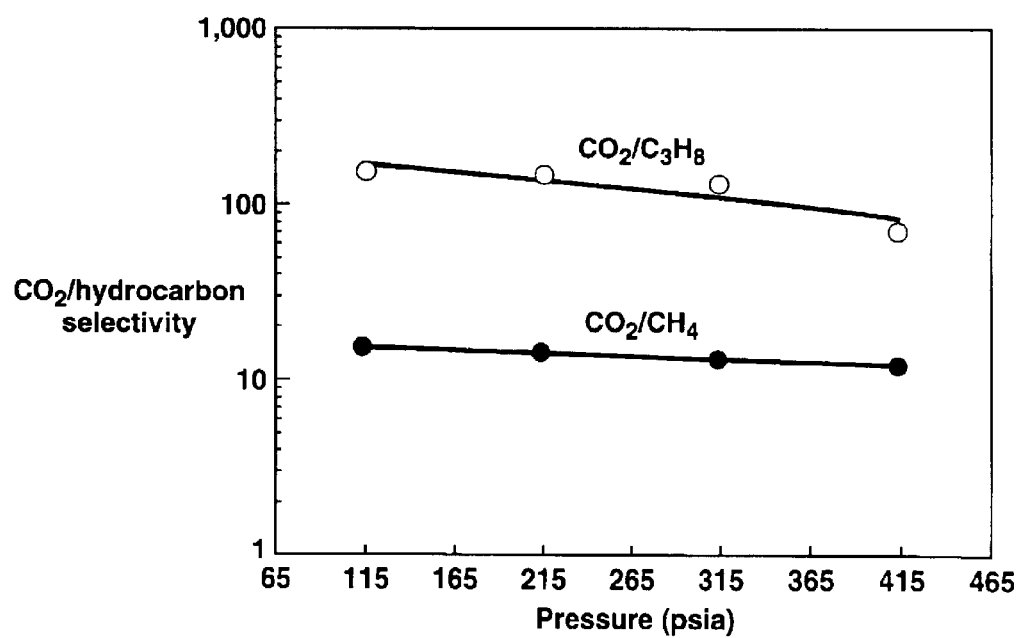
FIG. 12 is a graph of mixed-gas carbon dioxide/hydrocarbon selectivities based on the mixed gas data of FIG. 11.

As can be seen in FIG. 11, the fluxes all increased across the range of pressures. The carbon dioxide flux increased from 46.5 GPU to 136 GPU. The methane flux increased from 3.1 GPU to 11.6 GPU. The propane flux increased from 0.3 GPU to 2.0 GPU. As shown in FIG. 12, the carbon dioxide/methane selectivity decreased only slightly from 15 to 12 across the range of pressures. The carbon dioxide/propane selectivity decreased from 152 to 68.

Example 9

Comparison of Carbon Dioxide/Methane Selectivity with and without Propane in the Gas Mixture A Hyflon® AD60 membrane was prepared and was subjected to a permeation experiment using the same general procedure as in Example 1 with a feed gas mixture containing 70% carbon dioxide and 30% methane. Another Hyflon® AD60 membrane was prepared as in Example 4, and was subjected to a permeation experiment using the same general procedure as in Example 1 with a feed gas mixture containing 63% carbon dioxide, 27% methane, and 10% propane. For both experiments, the temperature was 20° C., and the feed pressure was 115 psia. The pressure-normalized fluxes were measured, and the selectivities were calculated. The results are shown in Table 5.

TABLE 5

| Gas Mixture | Flux (GPU) | | | Selectivity (–) |
|---|---|---|---|---|
| | $CO_2$ | $CH_4$ | $C_3H_8$ | $CO_2/CH_4$ |
| Binary Gas Mixture | 89 | 5.2 | — | 17 |
| Multicomponent Gas Mixture | 46.5 | 3.1 | 0.3 | 15.0 |

Examples 10–15

Use of Fluoropolymer Layer as Protective Coating Layer

Example 10

Asymmetric, microporous poly(vinylidene fluoride) [PVDF] support membranes were prepared. Composite membranes were prepared using a coating solution of 1 wt % 4,4'-(hexafluoroisopropylidene) diphthalic anhydride-1,3-phenylenediamine (6FDA-MPDA) in chloroform.

The support membranes were dip-coated in the coating solution at 1 ft/min coating speed, then dried in an oven at 60° C. for 60 minutes. The resulting membranes had a selective layer thickness ranging from 0.2–0.5 μm. Samples of finished composite membrane were cut into 12.6 $cm^2$ stamps and tested in a permeation test-cell apparatus with a gas mixture of 80% methane, 10% nitrogen, and 10% carbon dioxide at 35° C. feed temperature and 150 psig feed pressure. The membranes were first tested with the dry gas mixture, then with the gas mixture saturated with toluene vapor. During each test, the feed, permeate, and residue compositions were analyzed by gas chromatography (GC). The gas fluxes of the membranes were measured, and the selectivities were calculated. Table 6 summarizes the fluxes and the selectivities of the composite membranes.

TABLE 6

| Gas Mixture | Flux (GPU) | | | Selectivity (–) | | |
|---|---|---|---|---|---|---|
| | $CO_2$ | $N_2$ | $CH_4$ | $CO_2/N_2$ | $CO_2/CH_4$ | $N_2/CH_4$ |
| Dry Gas | 15.0 | 0.9 | 0.4 | 16.4 | 37.8 | 2.3 |
| Toluene-Saturated Gas | 25.1 | 1.6 | 1.7 | 15.3 | 14.8 | 1.0 |

Example 11

Membranes were prepared as in Example 10 above, except that the composite membranes were coated with a protective layer of Hyflon® AD60.

Samples of the Hyflon® AD60-coated finished composite membrane were tested as in Example 10. Table 7 summarizes the fluxes and the selectivities of the composite membranes.

TABLE 7

| Gas Mixture | Flux (GPU) | | | Selectivity (−) | | |
|---|---|---|---|---|---|---|
| | $CO_2$ | $N_2$ | $CH_4$ | $CO_2/N_2$ | $CO_2/CH_4$ | $N_2/CH_4$ |
| Dry Gas | 12.9 | 0.8 | 0.3 | 16.0 | 44.5 | 2.8 |
| Toluene-Saturated Gas | 28.3 | 1.6 | 1.4 | 17.5 | 20.5 | 1.2 |

Example 12

Membranes were prepared as in Example 10, except that the composite membranes were coated with a protective layer of Hyflon® AD80.

Samples of the Hyflon® AD80-coated finished composite membrane were tested only with the toluene-saturated gas mixture as in Example 10. Table 8 summarizes the fluxes and the selectivities of the composite membranes.

TABLE 8

| Gas Mixture | Flux (GPU) | | | Selectivity (−) | | |
|---|---|---|---|---|---|---|
| | $CO_2$ | $N_2$ | $CH_4$ | $CO_2/N_2$ | $CO_2/CH_4$ | $N_2/CH_4$ |
| Toluene-Saturated Gas | 41.1 | 2.3 | 2.9 | 17.6 | 14 | 0.8 |

Example 13

Membranes were prepared as in Example 10, except that the composite membranes were coated with a protective layer of Cytop®.

Samples of the Cytop®-coated finished composite membrane were tested only with the toluene-saturated gas mixture as in Example 10. Table 9 summarizes the fluxes and the selectivities of the composite membranes.

TABLE 9

| Gas Mixture | Flux (GPU) | | | Selectivity (−) | | |
|---|---|---|---|---|---|---|
| | $CO_2$ | $N_2$ | $CH_4$ | $CO_2/N_2$ | $CO_2/CH_4$ | $N_2/CH_4$ |
| Toluene-Saturated Gas | 19.3 | 1.2 | 1.0 | 16.5 | 19.0 | 1.1 |

Example 14

Composite membranes were prepared using a similar technique to that of Example 10. In this case, a polyetherimide (PEI) support membrane was used. The support was coated with a silicone rubber gutter layer then overcoated with a Cytop® selective layer, followed by another silicone rubber layer. In this case, therefore, the Cytop was used as the selective layer rather than the protective layer.

Samples of this four-layer composite were then overcoated with a protective layer of a 3 wt % copolymer solution of Hyflon® AD60.

Samples of finished composite membranes, both with and without the Hyflon protective coating, were cut into 12.6 cm² stamps and tested in a permeation test-cell apparatus with the pure gases carbon dioxide and methane. The tests were carried out at a feed pressure of 65 psia and at temperature of 45° C. The pressure on the permeate side was atmospheric.

Samples of the coated and uncoated composites were also tested with a simulated natural gas mixture having the following composition:

| | |
|---|---|
| Carbon dioxide | 8% |
| Methane | 71% |
| Ethane | 8.5% |
| Propane | 8.5% |
| n-Butane | 3% |
| n-Pentane | 1%. |

The gas mixture tests were performed at a feed pressure of 1,015 psia and a temperature of 45° C. The pressure on the permeate side was atmospheric.

During each test, the feed, permeate, and residue compositions were analyzed by gas chromatography (GC). The gas fluxes of the membranes were measured, and the selectivities were calculated. Table 10 summarizes the results.

TABLE 10

| Membrane | Test gas | Pressure-normalized flux (GPU) | | Selectivity |
|---|---|---|---|---|
| | | $CO_2$ | $CH_4$ | $CO_2/CH_4$ |
| Uncoated | Pure gas | 154 | 8.1 | 19.0 |
| | Gas mixture | 254 | 36.6 | 7.0 |
| Coated | Gas mixture | 160 | 15.7 | 10.2 |

As can be seen, the coated membrane provided a selectivity substantially higher than that provided by the uncoated membrane in the presence of $C_{3+}$ hydrocarbons.

Example 15

The experiments of Example 14 were repeated. In this case, the selective Cytop® layer was a little thicker, and the protective coat used a 2 wt % Hyflon® AD60 solution. The results are summarized in Table 11.

TABLE 11

| Membrane | Test gas | Pressure-normalized flux (GPU) | | Selectivity |
|---|---|---|---|---|
| | | $CO_2$ | $CH_4$ | $CO_2/CH_4$ |
| Uncoated | Pure gas | 85.9 | 3.2 | 26.8 |
| | Gas mixture | 175 | 18.1 | 9.7 |
| Coated | Gas mixture | 153 | 11.2 | 13.6 |

Again, the coated membranes exhibited substantially better selectivity than the uncoated membranes in the presence of $C_{3+}$ hydrocarbons.

Examples 16–17

Mixed-Gas Permeation Properties in Modules

Example 16

Hyflon® AD60 Membrane Module Permeation Properties at 20° C.

Hyflon® AD60 membranes were prepared as in Example 1. The resulting membranes were rolled into a spiral-wound module, which was tested in a module test apparatus at 20°

C. at varying pressures. The feed gas mixture was 65% methane, 10% ethane, 5% propane, and 20% carbon dioxide. The saturation vapor pressure of this gas mixture was calculated to be approximately 1,150 psia. The pressure-normalized gas fluxes were measured and the selectivities calculated. The results are shown in Table 12.

TABLE 12

| Pressure | Pressure-Normalized Flux (GPU) | | | | $CO_2/CH_4$ Selectivity | $CO_2/C_3H_8$ Selectivity | $CH_4/C_3H_8$ Selectivity |
|---|---|---|---|---|---|---|---|
| (psia) | $CH_4$ | $C_2H_6$ | $C_3H_8$ | $CO_2$ | (—) | (—) | (—) |
| 213 | 8.1 | 3.4 | 1.6 | 135 | 16.6 | 84.5 | 5.1 |
| 315 | 7.9 | 3.4 | 1.7 | 117 | 14.8 | 69.0 | 4.6 |
| 414 | 9.2 | 4.1 | 2.0 | 123 | 13.4 | 61.6 | 4.6 |
| 515 | 11.1 | 4.9 | 2.3 | 132 | 11.8 | 57.3 | 4.8 |
| 615 | 14.4 | 6.5 | 2.6 | 148 | 10.2 | 56.7 | 5.5 |
| 715 | 16.0 | 7.4 | 3.0 | 146 | 9.1 | 48.8 | 4.6 |
| 815 | 18.8 | 8.9 | 3.5 | 148 | 7.9 | 42.4 | 5.4 |
| 915 | 22.8 | 11.5 | 4.4 | 152 | 6.7 | 34.5 | 5.2 |
| 1,015 | 29.1 | 15.8 | 7.0 | 146 | 5.0 | 20.8 | 4.1 |

As can be seen, the carbon dioxide flux remained relatively stable across the range of pressures. The methane and propane fluxes increased 3- to 4-fold with increasing pressure, resulting in the carbon dioxide/methane and carbon dioxide/propane selectivities decreasing with increasing pressure. However, even at 615 psia, at greater than 50% saturation, the membrane maintained a carbon dioxide/methane selectivity of 10.

Example 17

Hyflon® AD60 Membrane Module Permeation Properties at 0° C.

The experiment of Example 16 was repeated, except at 0° C. at varying pressures. The feed gas mixture was 65% methane, 10% ethane, 5% propane, and 20% carbon dioxide. At this low temperature, the saturation vapor pressure of the gas mixture was calculated to be approximately 915 psia. The pressure-normalized gas fluxes were measured and the selectivities calculated. The results are shown in Table 13.

TABLE 13

| Pressure | Pressure-Normalized Flux (GPU) | | | | $CO_2/CH_4$ Selectivity | $CO_2/C_3H_8$ Selectivity | $CH_4/C_3H_8$ Selectivity |
|---|---|---|---|---|---|---|---|
| (psia) | $CH_4$ | $C_2H_6$ | $C_3H_8$ | $CO_2$ | (—) | (—) | (—) |
| 213 | 5.3 | 2.6 | 1.7 | 116 | 21.6 | 67.9 | 3.1 |
| 315 | 5.1 | 2.5 | 1.6 | 95.2 | 18.8 | 59.5 | 3.2 |
| 414 | 6.5 | 3.3 | 1.8 | 108 | 16.7 | 59.9 | 3.6 |
| 515 | 7.4 | 3.7 | 2.1 | 120 | 16.2 | 57.0 | 3.5 |
| 615 | 12.5 | 6.7 | 3.2 | 151 | 12.0 | 47.2 | 3.9 |
| 715 | 17.1 | 10.0 | 4.2 | 170 | 10.0 | 40.6 | 4.1 |
| 815 | 22.5 | 13.8 | 6.9 | 184 | 8.1 | 26.6 | 3.3 |
| 915 | 45.2 | 36.6 | 20.5 | 222 | 4.9 | 10.8 | 2.2 |
| 1,015 | 54.5 | 43.7 | 23.6 | 224 | 4.1 | 9.5 | 2.3 |

As can be seen, the carbon dioxide flux nearly doubled across the range of pressures. The methane and propane fluxes increased 10- to 14-fold with increasing pressure, resulting in the carbon dioxide/methane and carbon dioxide/propane selectivities again decreasing with increasing pressure. However, even at 715 psia, at nearly 80% saturation, the membrane maintained a carbon dioxide/methane selectivity of 10.

Example 18

Hydrogen Recovery Process Design

Figure 13:
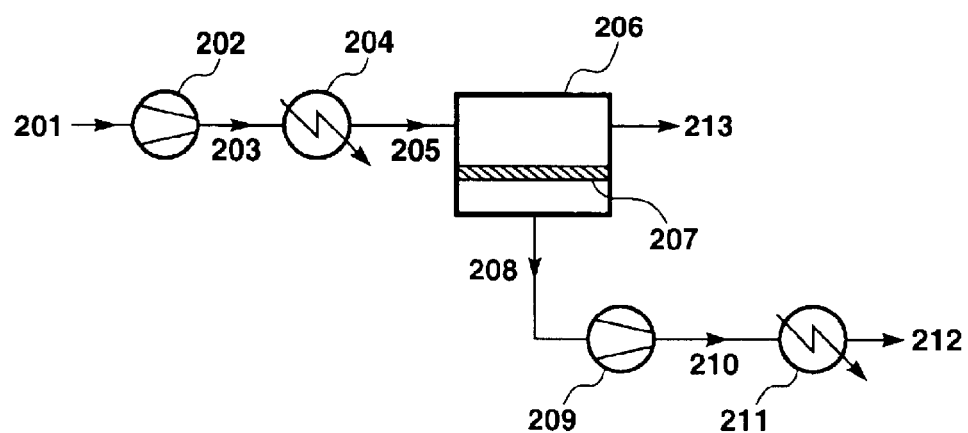
FIG. 13 is a schematic flow diagram of a simple process for recovering hydrogen from a refinery waste gas stream en route to the fuel header of the refinery.

A computer calculation was performed with a modeling program, ChemCad V (ChemStations, Inc., Houston, Tex.), to illustrate the process of the invention as reflected in the recovery of hydrogen from refinery off-gas destined for the fuel header. The process was assumed to be carried out as shown in FIG. 13.

Referring to this figure, refinery off-gas stream 201 at 200 psia passes to compressor 202 where it is compressed to 400 psia, stream 203. After passing through the compressor aftercooler, 204, the gas is passed as feed stream 205 to membrane separation unit 206. The membrane separation unit was assumed to contain membranes, 207, having a polyimide selective layer and a Hyflon® AD80 coating layer. The hydrogen-rich permeate stream, 208, is withdrawn from the membrane unit and passes to compressor 209, where it is recompressed to 200 psia, stream 210. After passing through the compressor aftercooler, 211, the hydrogen product stream emerges as stream 212 for use as a hydrogen source in the refinery. Obviously, if the hydrogen were not needed at pressure, the second compressor could be omitted. The residue stream, 213, now at close to its dewpoint, is withdrawn from the feed side of the membrane unit.

The flow rate of the raw off-gas was assumed to be 5 MMscfd, and the gas was assumed to contain 35% hydrogen, 5% nitrogen and 60% $C_1$–$C_6$ hydrocarbons, of which 15% were assumed to be $C_{3+}$ hydrocarbons. The raw gas was assumed to be at 200 psia and 25 C. The permeate side of the membrane was assumed to be at 50 psia. The results of the calculations are summarized in Table 14.

TABLE 14

| Stream | 201 | 205 | 208 | 213 |
|---|---|---|---|---|
| Flow (MMscfd) | 5 | 5 | 1.5 | 3.5 |
| Pressure (psia) | 200 | 400 | 50 | 400 |
| Temperature (° C.) | 25 | 70 | 73 | 72 |
| Component (vol %): | | | | |
| Hydrogen | 35 | 35 | 92.4 | 10.0 |
| Methane | 30 | 30 | 4.7 | 41.0 |
| Ethane | 15 | 15 | 0.4 | 21.4 |
| Propane | 10 | 10 | 0.1 | 14.3 |
| n-Butane | 3 | 3 | — | 4.3 |
| n-Hexane | 2 | 2 | — | 2.9 |
| Nitrogen | 5 | 5 | 2.3 | 6.2 |

As can be seen, the residue stream is reduced in volume from 5 MMscfd to 3.5 MMscfd and in hydrogen content from 35% to 10%, and would be suitable for sending to the fuel header. The permeate product stream contains over 90% hydrogen and is suitable for reuse in the refinery. Hydrogen recovery is close to 80%.

We claim:

1. A gas separation process, comprising:

(a) providing a membrane having a feed side and a permeate side and comprising;

(i) a base membrane comprising a selective layer of a first polymer on the feed side, and (ii) a $C_{3+}$ hydrocarbon-resistant coating layer of a second polymer coating the base membrane on the feed side;

wherein, when measured under the same conditions and in the absence of $C_{3+}$ hydrocarbons, the first polymer has a higher hydrogen/methane selectivity and a lower hydrogen permeability than the second polymer; and wherein the second polymer has a fractional free volume no greater than about 0.3 and a glass transition temperature of at least about 100° C., and is chosen from the group consisting of (I) polymers comprising repeating units having a fluorinated cyclic structure of an at least 5-member ring and (II) polymers having a ratio of fluorine to carbon atoms in the polymer greater than 1:1;

(b) passing a gas mixture comprising a first gas that is not a $C_{3+}$ hydrocarbon, a second gas that is not a $C_{3+}$ hydrocarbon and a $C_{3+}$ hydrocarbon across the feed side;

(c) providing a driving force for transmembrane permeation;

(d) withdrawing from the permeate side a permeate stream enriched in the first gas compared to the gas mixture;

(e) withdrawing from the feed side a residue stream depleted in the first gas compared to the gas mixture.

2. The process of claim 1, wherein the first gas is selected from the group consisting of hydrogen and carbon dioxide.

3. The process of claim 1, wherein the second gas is selected from the group consisting of methane, ethane and ethylene.

4. The process of claim 1, wherein the gas mixture is a refinery gas stream.

5. The process of claim 1, wherein the gas mixture is a petrochemical plant gas stream.

6. The process of claim 1, wherein the gas mixture is natural gas.

7. The process of claim 1, wherein the gas mixture is associated gas.

8. The process of claim 1, wherein the second polymer is formed from a monomer selected from the group consisting of fluorinated dioxoles and fluorinated dioxolanes.

9. The process of claim 1, wherein the second polymer comprises a copolymer.

10. The process of claim 1, wherein the second polymer has the formula:

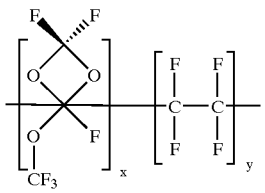

where x and y represent the relative proportions of the dioxole and the tetrafluoroethylene blocks, such that x+y=1.

11. The process of claim 1, wherein the second polymer has a propane permeability as measured at 25° C. with pure propane of no greater than about 20 Barrer, a methane permeability as measured at 25° C. with pure methane of at least about 5 Barrer, and a hydrogen permeability as measured at 25° C. with pure hydrogen of at least about 50 Barrer.

12. The process of claim 1, wherein the second polymer has an n-butane permeability as measured at 25° C. with pure n-butane of no greater than about 5 Barrer.

13. The process of claim 1, wherein the base membrane is an integral asymmetric membrane.

14. The process of claim 1, wherein the base membrane is a composite membrane.

15. The process of claim 1, wherein the first polymer is selected from the group consisting of polysulfone, cellulose acetate, polyamide, polyaramid, polyimide, polyetherimide, polyester, polycarbonate, polyvinylidene fluoride, polypropylene, polyethylene or polytetrafluoroethylene.

16. The process of claim 1, wherein the gas mixture, as brought into contact with the feed side, has a total $C_{3+}$ hydrocarbons partial pressure of at least about 50 psia.

17. The process of claim 1, wherein the gas mixture, as brought into contact with the feed side, has a carbon dioxide partial pressure of at least about 50 psia.

18. The process of claim 1, wherein the membrane provides a pressure-normalized hydrogen flux when in use in the process of at least about 50 GPU.

19. The process of claim 1, wherein the membrane provides a pressure-normalized carbon dioxide flux when in use in the process of at least about 50 GPU.

20. The process of claim 1, further comprising passing the permeate stream to additional separation treatment.

21. The process of claim 1, further comprising passing the residue stream to additional separation treatment.

22. The process of claim 1, wherein the membrane exhibits a mixed-gas selectivity for hydrogen over methane as measured at the operating conditions of the process of at least about 20.

23. The process of claim 1, wherein the membrane exhibits a mixed-gas selectivity for carbon dioxide over methane as measured at the operating conditions of the process of at least about 15.

24. The process of claim 1, wherein the gas mixture comprises a process or off-gas stream from a hydroprocessor.

25. The process of claim 1, wherein the gas mixture comprises a process or off-gas stream from a catalytic reformer.

26. The process of claim 1, wherein the gas mixture comprises a process or off-gas stream from a fluid catalytic cracker.

27. The process of claim 1, wherein the gas mixture comprises a process or off-gas stream from a steam cracker.

28. The process of claim 1, wherein the gas mixture comprises a process or off-gas stream from a steam reformer.

29. The process of claim 1, wherein the gas mixture comprises natural gas.

30. The process of claim 1, wherein the gas mixture comprises associated gas.

31. The process of claim 1, further comprising removing a contaminant material that has been brought into a module housing the separation membrane during operation of steps (a) through (d) by:

(f) discontinuing steps (b) through (e); and (g) flushing the module with an organic solvent.

32. A separation membrane, comprising:

(a) a base membrane having a feed side and a permeate side, and comprising a polymeric selective layer on the feed side, wherein the base membrane exhibits:

(i) a first selectivity for a first gas over a second gas under a set of operating conditions and in the absence of $C_{3+}$ hydrocarbons, and (ii) a second selectivity for the first gas over the second gas under the same set of operating conditions as in (i) but in the presence of $C_{3+}$ hydrocarbons, wherein the second selectivity is lower than the first selectivity; and (iii) a first pressure-normalized flux for the first gas under the set of operating conditions and in the absence of $C_{3+}$ hydrocarbons;

(b) a $C_{3+}$ hydrocarbon-resistant polymeric coating layer coating the base membrane on the feed side, wherein the polymeric coating layer comprises a polymer chosen from the group consisting of (i) polymers comprising repeating units having a fluorinated cyclic structure of an at least 5-member ring, the polymers having a fractional free volume no greater than about 0.3, and
(ii) polymers having (A) a ratio of fluorine to carbon atoms in the polymer greater than 1:1;

(B) a fractional free volume no greater than about 0.3; and (C) a glass transition temperature of at least about 100° C.; and wherein the gas separation membrane exhibits:

(i) a third selectivity for the first gas over the second gas under the same set of operating conditions and in the presence of $C_{3+}$ hydrocarbons that is higher than the second selectivity and at least about 70% of the first selectivity, and (ii) a second pressure-normalized flux for the first gas under the same set of operating conditions and in the presence of $C_{3+}$ hydrocarbons that is at least about 70% of the first pressure-normalized flux.

33. The membrane of claim 32, wherein the polymeric coating layer comprises a perfluorinated polymer.

34. The membrane of claim 32, wherein the polymeric coating layer comprises a polymer formed from a fluorinated dioxole monomer.

35. The membrane of claim 32, wherein the polymeric coating layer comprises a polymer formed from a fluorinated dioxolane monomer.

36. The membrane of claim 32, wherein the polymeric coating layer comprises a copolymer.

37. The membrane of claim 32, wherein the polymeric coating layer comprises a copolymer formed from fluorinated dioxole and tetrafluoroethylene repeat units.

38. The membrane of claim 32, wherein the polymeric coating layer comprises a polymer having the formula:

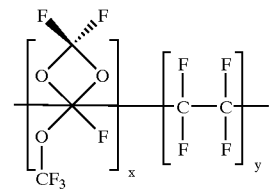

where x and y represent the relative proportions of the dioxole and the tetrafluoroethylene blocks, such that x+y=1.

39. The membrane of claim 32, wherein the base membrane is an integral asymmetric membrane.

40. The membrane of claim 32, wherein the base membrane is a composite membrane.

41. The membrane of claim 32, wherein the polymeric selective layer comprises a glassy polymer.

42. The membrane of claim 32, wherein the polymeric selective layer comprises a polymer selected from the group consisting of polysulfone, cellulose acetate, polyamide, polyaramid, polyimide, polyetherimide, polyester, polycarbonate, polyvinylidene fluoride, polypropylene, polyethylene or polytetrafluoroethylene.

43. The membrane of claim 32, wherein the polymeric selective layer comprises a polyimide.

44. The membrane of claim 32, in the form of a flat sheet.

45. The membrane of claim 32, in the form of a hollow fiber.

* * * * *